(12) United States Patent
Conway

(10) Patent No.: US 7,814,285 B2
(45) Date of Patent: Oct. 12, 2010

(54) METHOD AND APPARATUS FOR FILTERING MEMORY WRITE SNOOP ACTIVITY IN A DISTRIBUTED SHARED MEMORY COMPUTER

(75) Inventor: Patrick N. Conway, Los Altos, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 0 days.

(21) Appl. No.: 12/708,008

(22) Filed: Feb. 18, 2010

(65) Prior Publication Data

US 2010/0146215 A1    Jun. 10, 2010

Related U.S. Application Data

(62) Division of application No. 12/118,818, filed on May 12, 2008, now Pat. No. 7,669,018, which is a division of application No. 10/819,451, filed on Apr. 7, 2004, now Pat. No. 7,373,466.

(51) Int. Cl.
*G06F 12/08* (2006.01)

(52) U.S. Cl. .......................... 711/156; 711/3; 711/133; 711/146; 711/148

(58) Field of Classification Search .................. 711/156
See application file for complete search history.

(56) References Cited

U.S. PATENT DOCUMENTS

| | | | |
|---|---|---|---|
| 2009/0019230 A1* | 1/2009 | Colglazier et al. | 711/141 |
| 2009/0083498 A1* | 3/2009 | Hansen et al. | 711/154 |
| 2009/0100227 A1* | 4/2009 | Hansen et al. | 711/119 |

* cited by examiner

*Primary Examiner*—Hetul Patel
(74) *Attorney, Agent, or Firm*—Meyertons, Hood, Kivlin, Kowert & Goetzel, P.C.; Anthony M. Petro

(57) ABSTRACT

A method and apparatus for filtering memory probe activity for writes in a distributed shared memory computer. In one embodiment, the method may include initiating a first store operation to a cache data block stored in a first cache from a first processing node; assigning a modified cache state to said cache data block in response to initiating said first store operation. The method may further include initiating a first load operation to said cache data block from a second processing node; and assigning a pairwise-shared directory state to a coherence directory entry corresponding to said cache data block in response to initiating said first load operation, where the pairwise-shared directory state is distinct from a shared directory state.

10 Claims, 18 Drawing Sheets

| Command | Packet Type |
| --- | --- |
| ReadSized | Command |
| RdBlk | Command |
| RdBlkS | Command |
| RdBlkMod | Command |
| ChangetoDirty | Command |
| WrSized | Command/Data |
| VicBlk | Command/Data |
| Probe | Command |
| Broadcast | Command |
| ValidateBlk | Command |
| RdResponse | Response/Data |
| ProbeResp | Response |
| TgtStart | Response |
| TgtDone | Response |
| SrcDone | Response |
| MemCancel | Response |
| Nop | Info |
| Sync | Info |

| Address | $Tag_{L2}$ | $Index_{L2}$ | $Index_{PV}$ | Offset |
|---|---|---|---|---|

*Fig. 16*

METHOD AND APPARATUS FOR FILTERING MEMORY WRITE SNOOP ACTIVITY IN A DISTRIBUTED SHARED MEMORY COMPUTER

This application is a divisional application of U.S. patent application Ser. No. 12/118,818, entitled "Method and Apparatus for Filtering Memory Write Snoop Activity in a Distributed Shared Memory Computer", filed May 12, 2008 now U.S. Pat. No. 7,669,018, which is a divisional application of U.S. patent application Ser. No. 10/819,451, entitled "Method and Apparatus for Filtering Memory Write Snoop Activity in a Distributed Shared Memory Computer", filed Apr. 7, 2004, now U.S. Pat. No. 7,373,466, issued May 13, 2008.

BACKGROUND OF THE INVENTION

1. Field of the Invention

This invention is related to computer systems and, more particularly, to coherency mechanisms within computer systems.

2. Description of the Related Art

Typically, computer systems include one or more caches to reduce the latency of a processor's access to memory. Generally, a cache may store one or more blocks, each of which is a copy of data stored at a corresponding address in the memory system of the computer system.

Since a given block may be stored in one or more caches, and further since one of the cached copies may be modified with respect to the copy in the memory system, computer systems often maintain coherency between the caches and the memory system. Coherency is maintained if an update to a block is reflected by other cache copies of the block according to a predefined coherency protocol. Various specific coherency protocols are well known. As used herein, a "block" is a set of bytes stored in contiguous memory locations which are treated as a unit for coherency purposes. In some embodiments, a block may also be the unit of allocation and deallocation in a cache. The number of bytes in a block may be varied according to design choice, and may be of any size. As an example, 32 byte and 64 byte blocks are often used.

Many coherency protocols include the use of snoops, also referred to as probes, to communicate between various caches within the computer system. Generally speaking, a "probe" is a message passed from the coherency point in the computer system to one or more caches in the computer system to determine if the caches have a copy of a block and optionally to indicate the state into which the cache should place the block. The coherency point may transmit the probes in response to a command from a component (e.g. a processor or IO device) to read or write the block. Each probe receiver responds to the probe, and once the probe responses are received the command may proceed to completion. The coherency point is the component responsible for maintaining coherency, e.g. a memory controller for the memory system.

Computer systems generally employ either a broadcast cache coherency protocol or a directory based cache coherency protocol. In a system employing a broadcast protocol, probes are broadcast to all processors (or cache subsystems). When a subsystem having a shared copy of data observes a probe resulting from a command for exclusive access to the block, its copy is typically invalidated. Likewise, when a subsystem that currently owns a block of data observes a probe corresponding to that block, the owning subsystem typically responds by providing the data to the requestor and invalidating its copy, if necessary.

In contrast, systems employing directory based protocols maintain a directory containing information indicating the existence of cached copies of data. Rather than unconditionally broadcasting probes, the directory information is used to determine particular subsystems (that may contain cached copies of the data) to which probes need to be conveyed in order to cause specific coherency actions. For example, the directory may contain information indicating that various subsystems contain shared copies of a block of data. In response to a command for exclusive access to that block, invalidation probes may be conveyed to the sharing subsystems. The directory may also contain information indicating subsystems that currently own particular blocks of data. Accordingly, responses to commands may additionally include probes that cause an owning subsystem to convey data to a requesting subsystem. Numerous variations of directory based cache coherency protocols are well known.

Since probes must be broadcast to all other processors in systems that employ broadcast cache coherency protocols, the bandwidth associated with the network that interconnects the processors can quickly become a limiting factor in performance, particularly for systems that employ large numbers of processors or when a large number of probes are transmitted during a short period. In such environments, systems employing directory protocols may attain overall higher performance due to reduced latency when accessing local memory, lessened network traffic and the avoidance of network bandwidth bottlenecks.

While directory based systems may allow for more efficient cache coherency protocols, such systems may still require probes for certain transactions, which may increase the overall latency of such transactions. Further, additional hardware is often required to implement a directory based system. The directory mechanism often includes a directory cache that may be implemented on an ASIC (Application Specific Integrated Circuit) or other semi-custom chip separate from the processor. When the directory cache is implemented on a separate chip, the overall cost of the system may increase, as well as board requirements, power consumption, and cooling requirements. On the other hand, incorporation of a directory cache on the same chip as the processor core may be undesirable, particularly for commodity microprocessors intended for use in both single processor or multiple processor systems. When used in a single processor system, the directory cache would go unused, thus wasting valuable die area and adding cost due to decreased yield.

Another technique employed in shared memory computer systems to reduce memory latency is referred to as remote caching. In a system employing remote caching, a portion of the system memory attached to one node may be allocated for caching data corresponding to memory locations mapped to another node. The benefits of remote caching may be most significant in systems where remote memory latency is much greater than local memory latency.

In a system that implements remote caching, a storage mechanism is typically employed to identify lines or blocks that are contained in the remote caches. Like the foregoing, inclusion of such functionality within an integrated circuit which is intended for deployment in single-processor environments may lead to waste of die area and increased costs.

SUMMARY OF THE INVENTION

Various embodiments of a method and apparatus for filtering memory probe activity for writes in a distributed shared memory computer system are disclosed. In one embodiment, the method may include initiating a first store operation to a cache data block stored in a first cache, assigning a modified cache state to the cache data block in response to initiating the first store operation, evicting the cache data block from the first cache subsequent to initiating the first store operation, and assigning an uncached directory state to a coherence directory entry corresponding to the cache data block in response to the eviction.

In a second embodiment, the method may include initiating a first store operation to a cache data block stored in a first cache from a first processing node including the first cache, assigning a modified cache state to the cache data block in response to initiating the first store operation, evicting the cache data block from the first cache subsequent to initiating the first store operation, storing the cache data block in a remote cache in response to the eviction, and assigning a remote directory state to a coherence directory entry corresponding to the cache data block in response to storing the cache data block in the remote cache.

In a third embodiment, the method may include initiating a first store operation to a cache data block stored in a first cache from a first processing node, assigning a modified cache state to the cache data block in response to initiating the first store operation, initiating a first load operation to the cache data block from a second processing node, and assigning a pairwise-shared directory state to a coherence directory entry corresponding to the cache data block in response to initiating the first load operation.

In a fourth embodiment, the method may include initiating a first store operation to a cache data block from a first processing node, initiating a first load operation to the cache data block from a second processing node subsequent to initiating the first store operation, assigning a pairwise-shared directory state to a coherence directory entry corresponding to the cache data block in response to initiating the first load operation, initiating a second store operation to the cache data block from the second processing node subsequent to initiating the first load operation, and assigning a migratory directory state to the coherence directory entry in response to initiating the second store operation.

BRIEF DESCRIPTION OF THE DRAWINGS

Other objects and advantages of the invention will become apparent upon reading the following detailed description and upon reference to the accompanying drawings in which:

FIG. 2 is a table illustrating one embodiment of packet definitions.

FIG. 16 illustrates an alternative format for indexing a given presence bit.

Figure 1:
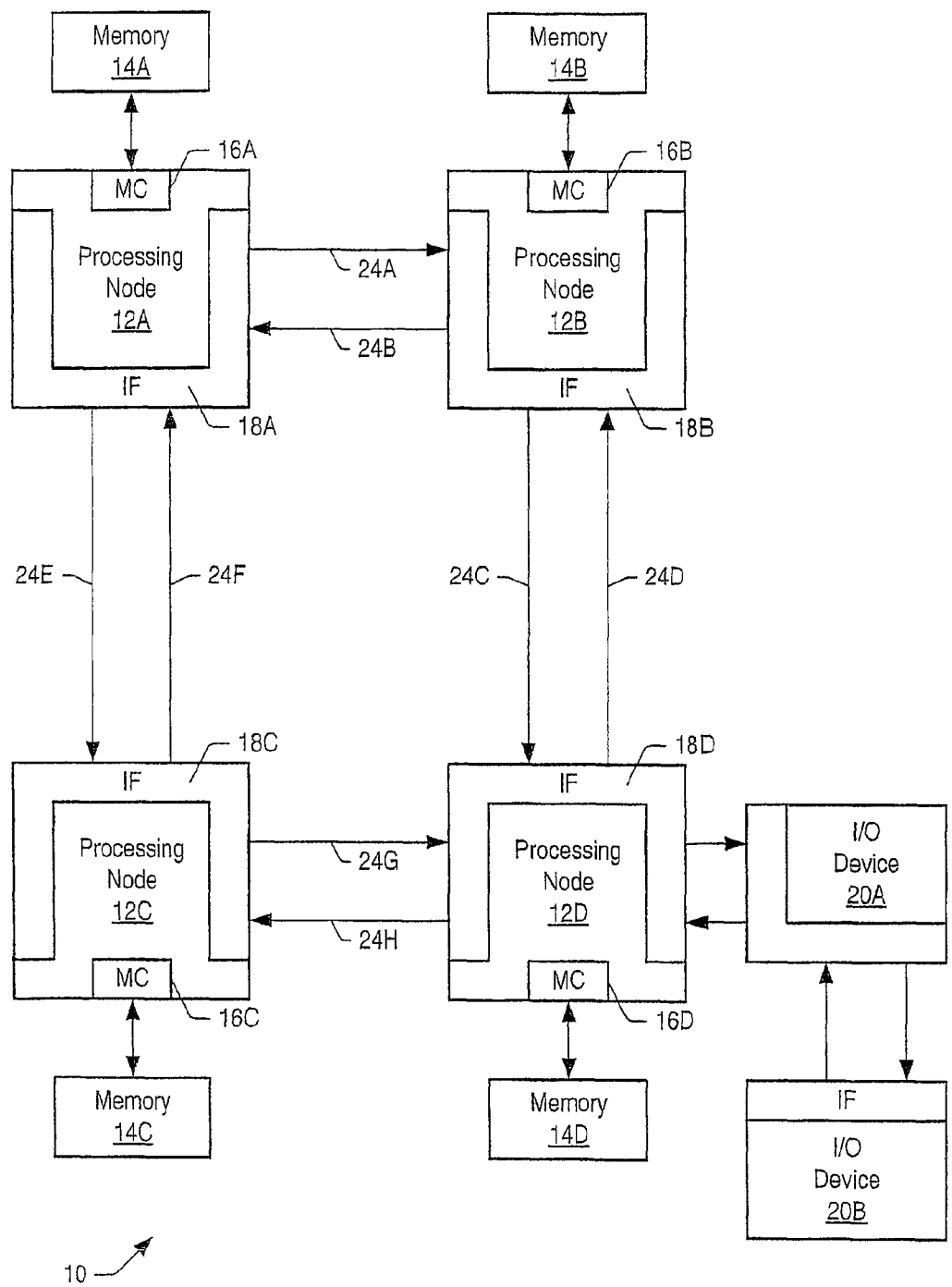
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

System Overview

Turning now to FIG. 1, one embodiment of a computer system 10 is shown. Computer system 10 includes a plurality of processing nodes 12A, 12B, 12C, and 12D. Each processing node is coupled to a respective memory 14A-14D via a respective memory controller 16A-16D. Additionally, each processing node 12A-12D includes interface logic 18A-18D used to communicate with others of the processing nodes 12A-12D. For example, processing node 12A includes interface logic 18A for communicating with processing nodes 12B and 12C. Similarly, processing node 12B includes interface logic 18B for communicating with processing nodes 12A and 12D, and so on. In the embodiment of FIG. 1, processing node 12D is shown coupled to communicate with an input/output (I/O) device 20A via interface logic 18D, and I/O device 20A is further coupled to a second I/O device 20B. Other processing nodes may communicate with other I/O devices in a similar fashion. Alternatively, a processing node may communicate with an I/O bridge which is coupled to an I/O bus.

Computer system 10 may implement a packet-based link for inter-node communication. In the depicted embodiment, the link is implemented as sets of unidirectional lines (e.g. lines 24A are used to transmit packets from processing node 12A to processing node 12B and lines 24B are used to transmit packets from processing node 12B to processing node 12A). Other sets of lines 24C-24H are used to transmit packets between other processing nodes as illustrated in FIG. 1. The link may be operated in a cache coherent fashion for communication between processing nodes or in a noncoherent fashion as a daisy-chain structure between I/O devices 20A-20B (and additional I/O devices, as desired). It is noted that a packet to be transmitted from one processing node to another may pass through one or more intermediate nodes. For example, a packet transmitted by processing node 12A to processing node 12D may pass through either processing node 12B or processing node 12C as shown in FIG. 1. Any suitable routing algorithm may be used. Other embodiments of computer system 10 may include more or fewer processing nodes than the embodiment shown in FIG. 1. In addition, other embodiments are possible in which each processing node is coupled to every other processing node through a point-to-point network.

In addition to the depicted memory controller and interface logic, each processing node 12A-12D may include one or more processors and associated caches, as described further below. Broadly speaking, a processing node comprises at least one processor and may optionally include a memory controller for communicating with a memory and other logic, as desired. It is noted that the terms "processing node" and "processor node" may be used interchangeably herein.

Memories 14A-14D may comprise any suitable memory devices. For example, a memory 14A-14D may comprise one or more RAMBUS DRAMs (RDRAMs), synchronous DRAMs (SDRAMs), DRAM, static RAM, etc. The address space of computer system 10 is divided among memories 14A-14D. Each processing node 12A-12D may include a memory map used to determine which addresses are mapped to which memories 14A-14D, and hence to which processing node 12A-12D a memory request for a particular address should be routed. The particular processing node associated with a given memory address may be referred to herein as the home node of that address. In one embodiment, the coherency point for an address within computer system 10 is the memory controller 16A-16D coupled to the memory storing bytes corresponding to the address. Memory controllers 16A-16D may comprise control circuitry for interfacing to memories 14A-14D. Additionally, memory controllers 16A-16D may include request queues for queuing memory requests.

Generally, interface logic 18A-18D may comprise buffers for receiving packets from the link and for buffering packets to be transmitted upon the link. Computer system 10 may employ any suitable link level flow control mechanism for transmitting packets reliably.

I/O devices 20A-20B are illustrative of any desired peripheral devices. For example, I/O devices 20A-20B may comprise network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Communications between processing nodes 12A-12D of computer system 10 may be accommodated using various specific packet-based messaging, as desired. FIG. 2 is a table 38 illustrating an exemplary set of packet-based messages employed according to one embodiment of the coherent link within computer system 10. Other embodiments are possible and contemplated, including embodiments employing other suitable packet definitions, or embodiments that employ bus based communication mechanisms.

As illustrated in FIG. 2, a read transaction may be initiated using one of the ReadSized, RdBlk, RdBlkS or RdBlkMod commands. The ReadSized command may be used for non-cacheable reads or reads of data other than a block in size. The amount of data to be read is encoded into the ReadSized command packet. For reads of a block, the RdBlk command may be used unless: (i) a writeable copy of the block is desired, in which case the RdBlkMod command may be used; or (ii) a copy of the block is desired but no intention to modify the block is known, in which case the RdBlkS command may be used. In general, the appropriate read command is transmitted from the source initiating the transaction to a target node which owns the memory corresponding to the block. The target node may transmit Probe commands to the other nodes in the system to maintain coherency. In some instances, the probe commands result in changes to the state of the block in certain nodes and an updated copy of the block, if present, to be sent to the source node. Each node receiving a Probe command transmits a ProbeResp response packet to the source node. If a probed node has an updated copy of the read data (i.e. dirty data), that node transmits a RdResponse response packet and the dirty data. Additionally, the memory controller in the target node transmits the requested read data using a RdResponse response packet followed by the data in a data packet. If the source node receives a RdResponse response packet from a probed node, that read data is used. Otherwise, the data from the target node is used. Once each of the probe responses and the read data is received in the source node, the source node transmits a SrcDone response packet to the target node as a positive acknowledgement of the termination of the transaction. A node transmitting dirty data may also transmit a MemCancel response packet to the target node in an attempt to cancel transmission by the target node of the requested read data.

A write transaction may be initiated using a WrSized or VicBlk command followed by a corresponding data packet. The WrSized command may be used for non-cacheable writes or writes of data other than a block in size. To maintain coherency for WrSized commands, the target node may transmit Probe commands to each of the other nodes in the system. In response to Probe commands, each probed node transmits a ProbeResp response packet to the target node. If a probed node is storing dirty data, the probed node responds with a RdResponse response packet and the dirty data. In this manner, a block updated by the WrSized command is returned to the memory controller for merging with the data provided by the WrSized command. The memory controller, upon receiving probe responses from each of the probed nodes, transmits a TgtDone response packet to the source node to provide a positive acknowledgement of the termination of the transaction. The source node replies with a SrcDone response packet.

A victim block which has been modified by a node and is being replaced in a cache within the node is transmitted back to memory using the VicBlk command. Probes are not needed for the VicBlk command. Accordingly, when the target memory controller is prepared to commit victim block data to memory, the target memory controller transmits a TgtDone response packet to the source node of the victim block. The source node replies with either a SrcDone response packet to indicate that the data should be committed or a MemCancel response packet to indicate that the data has been invalidated between transmission of the VicBlk command and receipt of the TgtDone response packet (e.g. in response to an intervening probe).

The ChangetoDirty command packet may be transmitted by a source node in order to obtain write permission for a block stored by the source node in a non-writeable state. A transaction initiated with a ChangetoDirty command may operate similar to a read except that the target node does not return data. The ValidateBlk command may be used to obtain write permission to a block not stored by a source node if the source node intends to update the entire block. No data is transferred to the source node for such a transaction, but otherwise operates similar to a read transaction.

The TgtStart response may be used by a target to indicate that a transaction has been started (e.g. for ordering of subsequent transactions). The Nop info packet is a no-operation packet which may be used, e.g. to transfer buffer free indications between nodes. The Broadcast command may be used to broadcast messages between nodes (e.g., the broadcast command may be used to distribute interrupts). Finally, the sync info packet may be used for cases in which synchronization of the fabric is desired (e.g. error detection, reset, initialization, etc.). It is noted that in other embodiments, other types of commands and associated coherency protocols may be employed, as desired.

Figure 3:
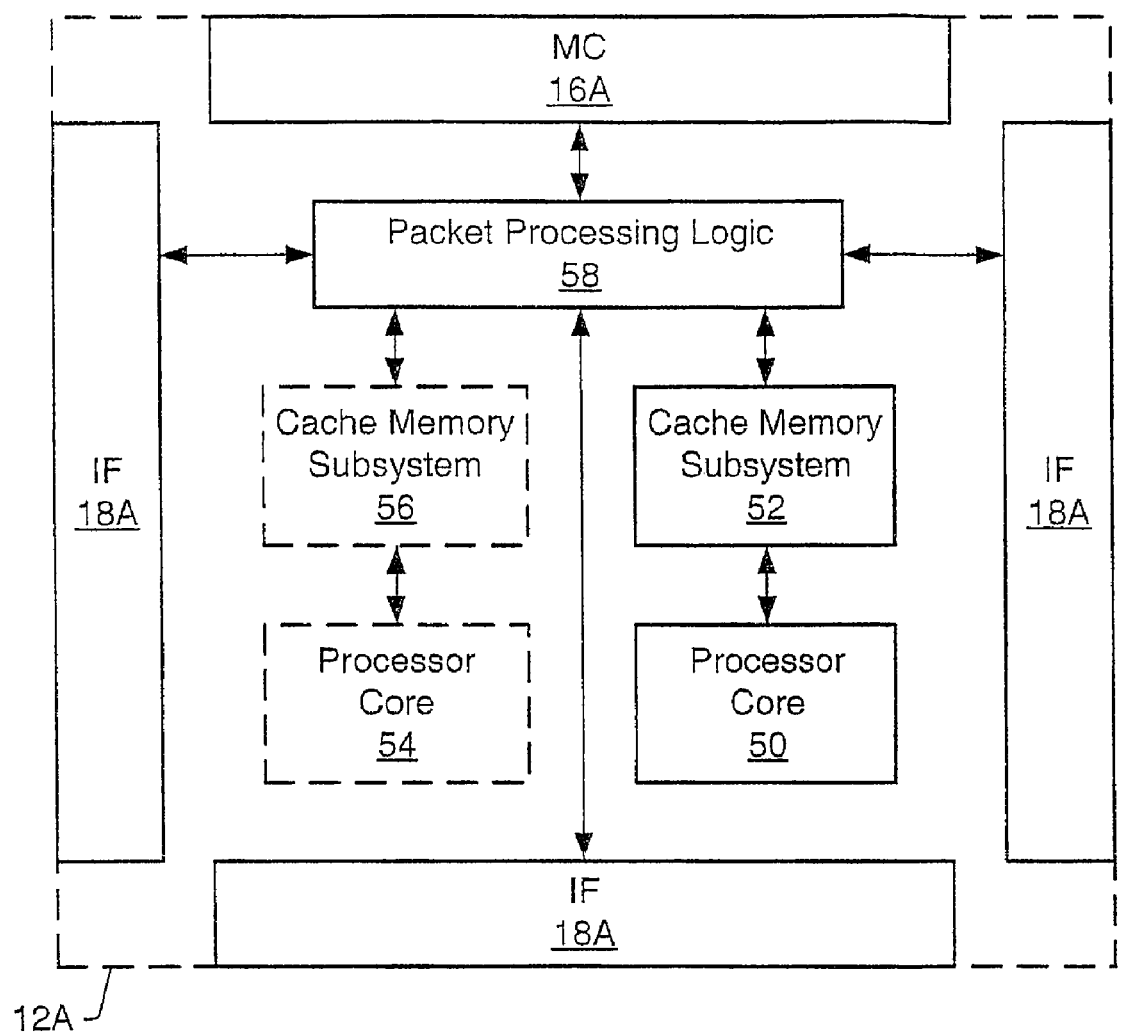
FIG. 3 is a block diagram of one embodiment of a processing node.

Turning next to FIG. 3, a block diagram of one embodiment of an exemplary processing node 12A is shown. Circuit portions that correspond to those of FIG. 1 are numbered identically. Processing node 12A includes memory controller 16A, interface logic 18A, a processor core 50, a cache memory subsystem 52 and packet processing logic 58. Processing node 12A may also include one or more additional processor cores 54 and cache memory subsystems 56, as desired. In one embodiment, the illustrated functionality of processing node 12A is incorporated upon a single integrated circuit. Processing nodes 12B-12D may be configured similarly.

Generally, packet processing logic 58 is configured to respond to control packets received on the links to which processing node 12A is coupled, to generate control packets in response to processor cores 50 and 54 and/or cache memory subsystems 52 and 56, to generate probe commands and response packets in response to transactions selected by memory controller 16A for service, and to route packets for which node 12A is an intermediate node to other nodes through interface logic 18A. Interface logic 18A may include logic to receive packets and synchronize the packets to an internal clock used by packet processing logic 58.

Cache subsystems 52 and 56 comprise high speed cache memories configured to store blocks of data. Cache memory subsystems 52 and 56 may be integrated within respective processor cores 50 and 54. Alternatively, cache memory subsystems 52 and 56 may be coupled to processor cores 52 and 56 in a backside cache configuration or an in-line configuration, as desired. Still further, cache memory subsystems 52 and 56 may be implemented as a hierarchy of caches. Caches which are nearer processor cores 50 and 54 (within the hierarchy) may be integrated into processor cores 50 and 54, if desired. In one embodiment, cache memory subsystems 52 and 56 each represent L2 cache structures.

Processor cores 50 and 54 include circuitry for executing instructions according to a predefined instruction set. For example, the x86 instruction set architecture may be selected. Alternatively, the Alpha, PowerPC, or any other instruction set architecture may be selected. Generally, the processor core 50 and 54 access the cache memory subsystems 52 and 56, respectively, for data and instructions. If a cache miss is detected, a read request is generated and transmitted to the memory controller within the node to which the missing block is mapped.

As will be described in further detail below, in one embodiment of computer system 10, directory entries may be maintained to filter probe command and response traffic for certain transactions. Rather than storing directory entries in a dedicated directory storage, directory entries may be stored in designated locations of cache memory subsystem 52 (and cache memory subsystem 56, depending upon the implementation). In a further embodiment of computer system 10, additional locations of cache memory subsystem 52 may be used for storing remote cache presence information. By utilizing cache memory subsystem 52 for the storage of directory entries and/or remote cache presence information, the need for a separate storage may be avoided. As a result, overall cost may be reduced, as well as required board area, power consumption, and cooling requirements. In addition, embodiments are possible in which utilization of cache memory subsystem 52 for the storage of directory entries and/or remote cache presence information may be selectively enabled based upon whether the subsystem is deployed in a single-processor environment or a multiple-processor environment. Thus, when deployed in a single-processor environment, the storage locations of the cache memory subsystem may be utilized exclusively for processor-caching operations, and the waste (i.e., non-utilization) of dedicated directory storage may be avoided. Specific details regarding these features of cache memory subsystem 52 will be provided further below.

Coherence Directory Organization and Operation

Figure 4:
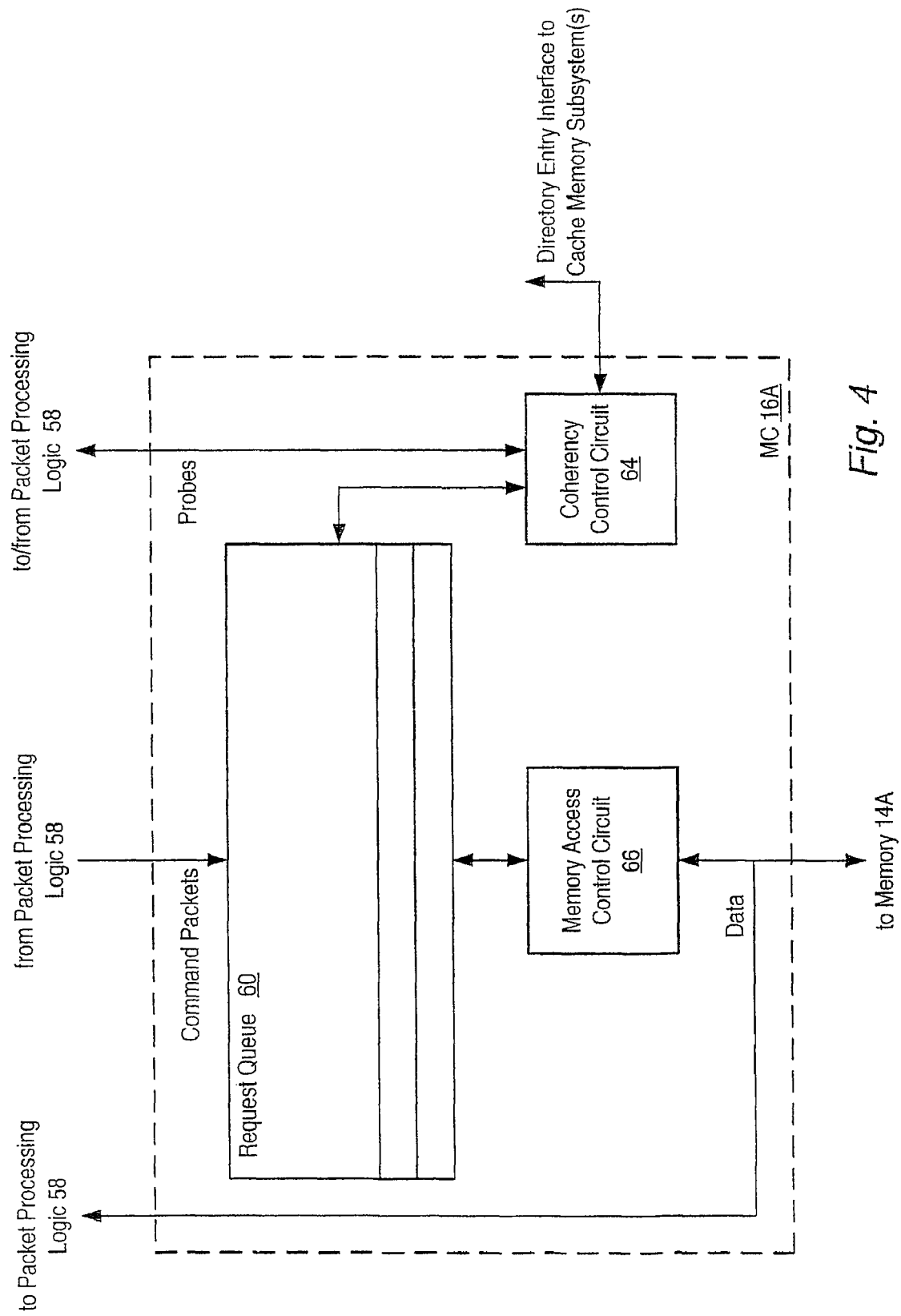
FIG. 4 is a block diagram of one embodiment of a memory controller.

Turning next to FIG. 4, a block diagram of one embodiment of memory controller 16A is shown. Memory controllers 16B-16D may be configured similarly. In the embodiment of FIG. 4, memory controller 16A includes a request queue 60, a coherency control circuit 64, and a memory access control circuit 66.

Memory controller 16A receives command packets from packet processing logic 58 into request queue 60. The command packets are routed to memory controller 16A by packet processing logic 58 if the address affected by the command corresponds to a memory location in memory 14A. In other words, if the address of the command packet addresses a block stored in memory 14A, the command packet is routed to memory controller 16A. Memory controller 16A queues the command information in request queue 60, and subsequently processes the command. Coherency control circuit 64 ensures that the command is performed in a coherent fashion. If probes are required for the command, coherency control circuit 64 transmits a probe indication to packet processing logic 58. For example, the probe indication may include the SrcNode, SrcUnit, and SrcTag from the corresponding command, the address, and the type of command. Packet processing logic 58 may transmit Probe commands in response to the probe indication. Coherency control circuit 64 may further receive SrcDone packets from packet processing logic 58, and may receive probe responses for WrSized commands. Memory access control circuit 66 may interface with memory 14A to perform commands which are committed by coherency control circuit 64 (e.g. after coherency operations have been transmitted and any responses to be received from other nodes have been received). If the command is a read, data may be returned from memory 14A to packet processing logic 58 for forwarding to the source node in a RdResponse packet.

Coherency control circuit 64 is additionally configured to maintain directory entries for certain data blocks. As discussed above, these directory entries are stored within designated locations of cache memory subsystem 52 and/or cache memory subsystem 56. For this purpose, coherency control circuit 64 may include an interface to the cache memory subsystem(s). Coherency control circuit 64 may determine if probes are required for a command based upon the type of command and based upon the presence of a directory entry for the address specified by the command. The directory entries may contain various coherency information, depending upon the implementation. For example, a directory entry may indicate the owner of a given block, whether the block is modified in a given mode, and/or the existence of nodes that have shared copies of the block. Further details regarding various exemplary directory entry formats are provided below.

Figure 5:
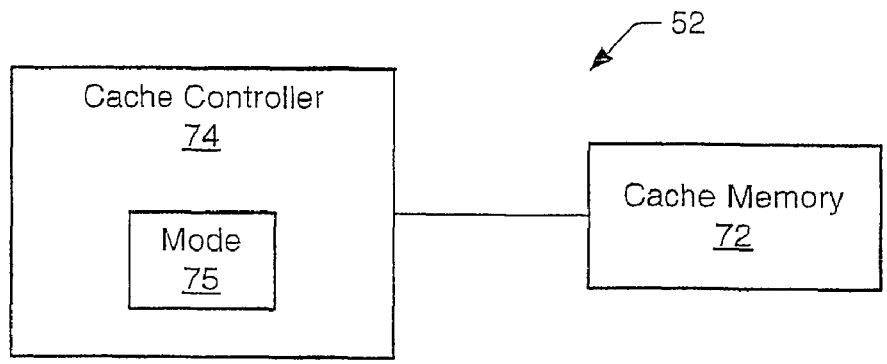
FIG. 5 is a block diagram of a cache memory subsystem.

FIG. 5 is a block diagram illustrating one embodiment of cache memory subsystem 52. The cache memory subsystem 52 includes a cache memory 72 coupled to a cache controller 74. In the depicted embodiment, cache controller 74 includes a mode storage unit 75, which may be programmably set to enable the storage of directory entries within locations of cache memory 72, as discussed below.

Figure 6:
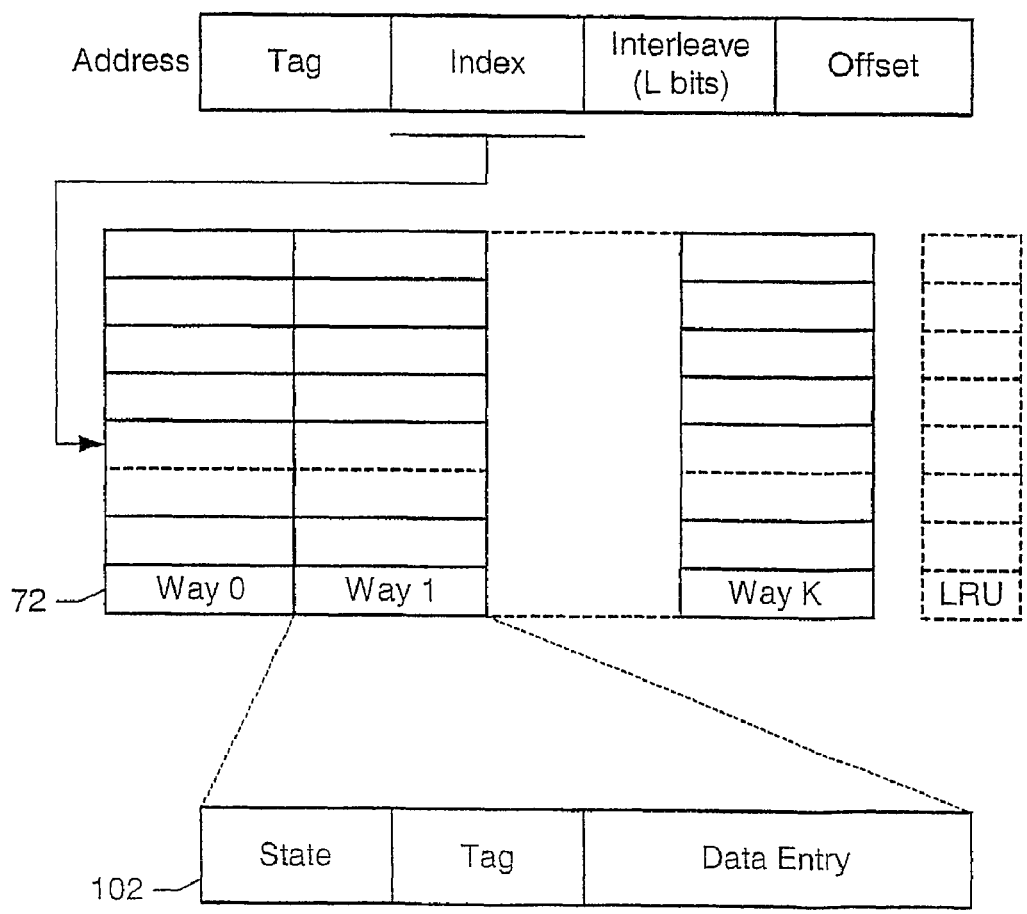
FIG. 6 illustrates one embodiment of a conventional cache arrangement.

Normal cache entries (that is, entries within cache memory 72 that store data operated upon by processor core 50) as well directory entries may be stored within cache memory 72 in a variety of specific formats, as desired. FIG. 6 illustrates one possible cache arrangement implemented as a K-way set associative cache structure with $2^L$ interleaves. A block of storage 102 within cache memory 72 is shown with a data entry, a tag field, and a state field. In one embodiment, the data entry consists of 64 bytes of data. The state field identifies the state of the cache block, such as Modified, Owned, Exclusive, Shared, or Invalid in the MOESI protocol. As described in greater detail below in conjunction with the description of FIGS. 17-20, additional coherence directory states may be defined that may improve coherence protocol efficiency for certain types of memory transactions. In a conventional manner, a cache hit may be determined by comparing a tag field of the address used to access the cache memory with tag information stored with the cache block. A given set of blocks of the cache memory is accessed using an index portion of the address. The LRU field indicates which entry in the set has been least recently referenced, and may be used in association with the cache replacement algorithm employed by cache controller 74. The cache arrangement illustrated in FIG. 6 is conventional. It is noted that in other embodiments, cache memory 72 may be implemented using other specific cache arrangements. It is also noted that when deployed in a single processor environment, all of the storage locations of cache memory 72 may be used for normal cache entries (e.g., by setting mode storage unit 75 of cache controller 74 in a single-processor environment mode).

As stated previously, when deployed in a multiple processor environment, some of the locations of cache memory 72 may be used to store directory entries. The directory entries may be maintained and accessed by coherency control circuit 64 for controlling coherency operations.

Figure 7:
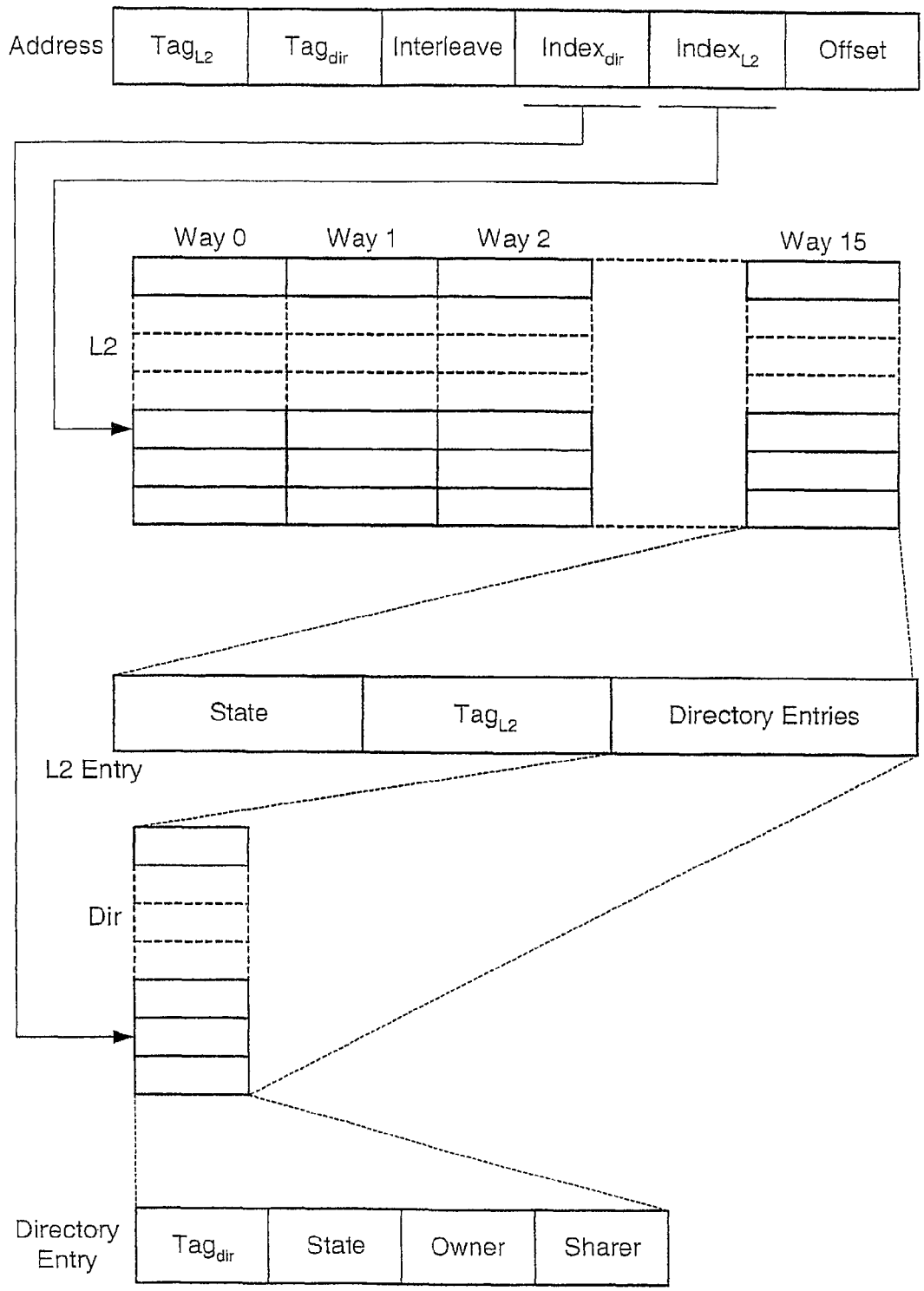
FIG. 7 illustrates a direct mapped directory cache organization.

The directory entries may be stored within cache memory 72 in various ways. For example, FIG. 7 illustrates a cache arrangement in which a designated way of cache memory 72 (e.g., way 15 in the depicted embodiment) may be used for storing directory entries. In one embodiment, this configuration may be programmably set by programming mode storage unit 75 of cache controller 74 in a multiple-processor environment mode.

The embodiment of FIG. 7 is illustrative of a direct mapped directory cache organization in which a given cache block may store a plurality of directory entries. For example, in one embodiment, each directory entry includes 16 bits, and thus a 64 byte data field in a cache block is capable of storing 32 directory entries. A given directory entry may be indexed by a directory index portion of the address used to access the cache. In one embodiment, directory entries may be interleaved across multiple cache memory subsystems (such as cache memory subsystems 52 and 56 of FIG. 3), based on selected bits of the address. A directory hit occurs when both the block tag (e.g., $Tag_{L2}$) stored with the cache block and the directory tag (e.g., $Tag_{dir}$) stored as a portion of the directory entry match corresponding tag portions of the address used to access the cache.

In one embodiment of computer system 10, directory entries are used to track blocks which are in Modified, Owned or Exclusive states. The presence of a directory entry implies that the block is cached. It is noted that the states E and M may be indistinguishable outside a processor core and corresponding cache memory subsystem since a processor may silently transition a block from Exclusive to Modified. Thus, in such an embodiment, a directory entry may include either a state O (Owned), a state ME (Modified/Exclusive) or a state I (Invalid). The absence of a directory entry implies the block is either shared or invalid in the various cache memory subsystems. It is noted that when a cache conflict miss occurs, all of the directory entries for the affected cache block must be downgraded from M, O or E state. Modified or Owned blocks are copied back to memory and the directory entry transitions to S state.

Figure 8:
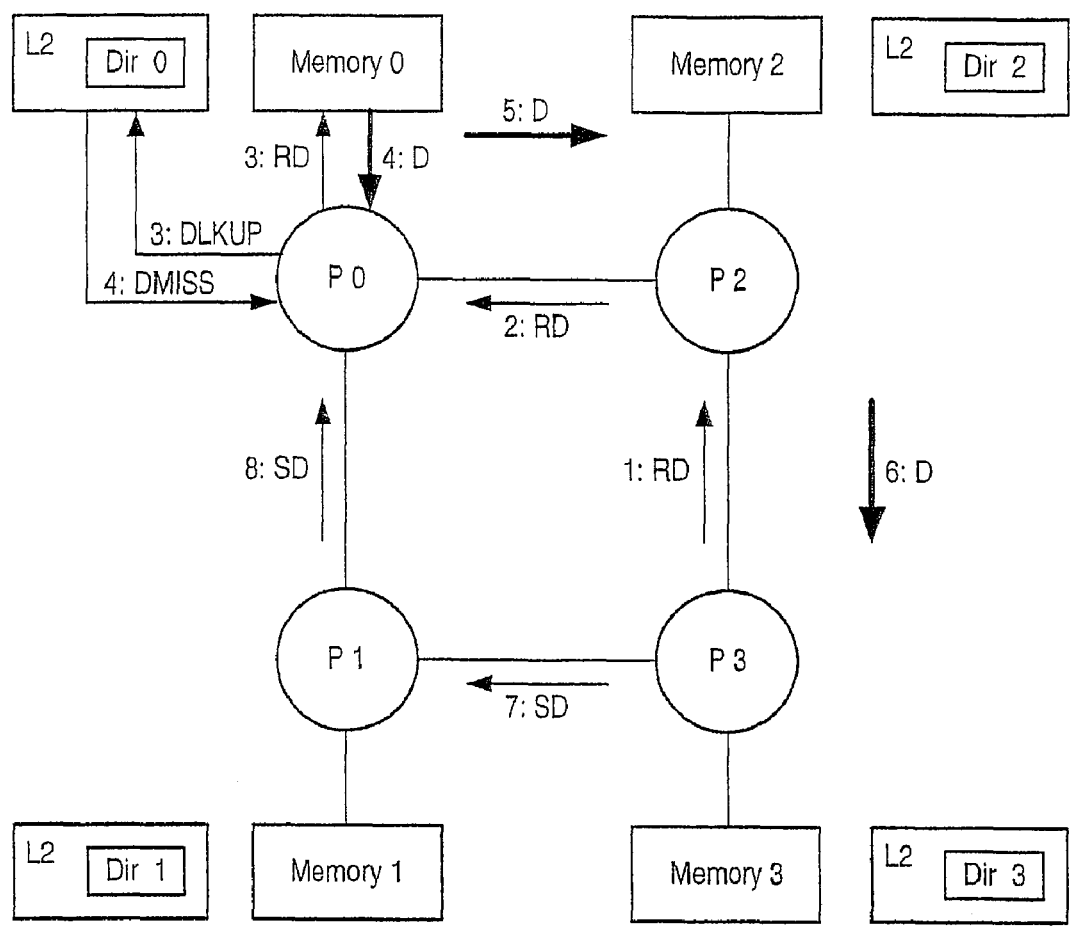
FIGS. 8 and 9 illustrate a manner in which directory entries may be utilized to filter probe command and response traffic.
Figure 9:
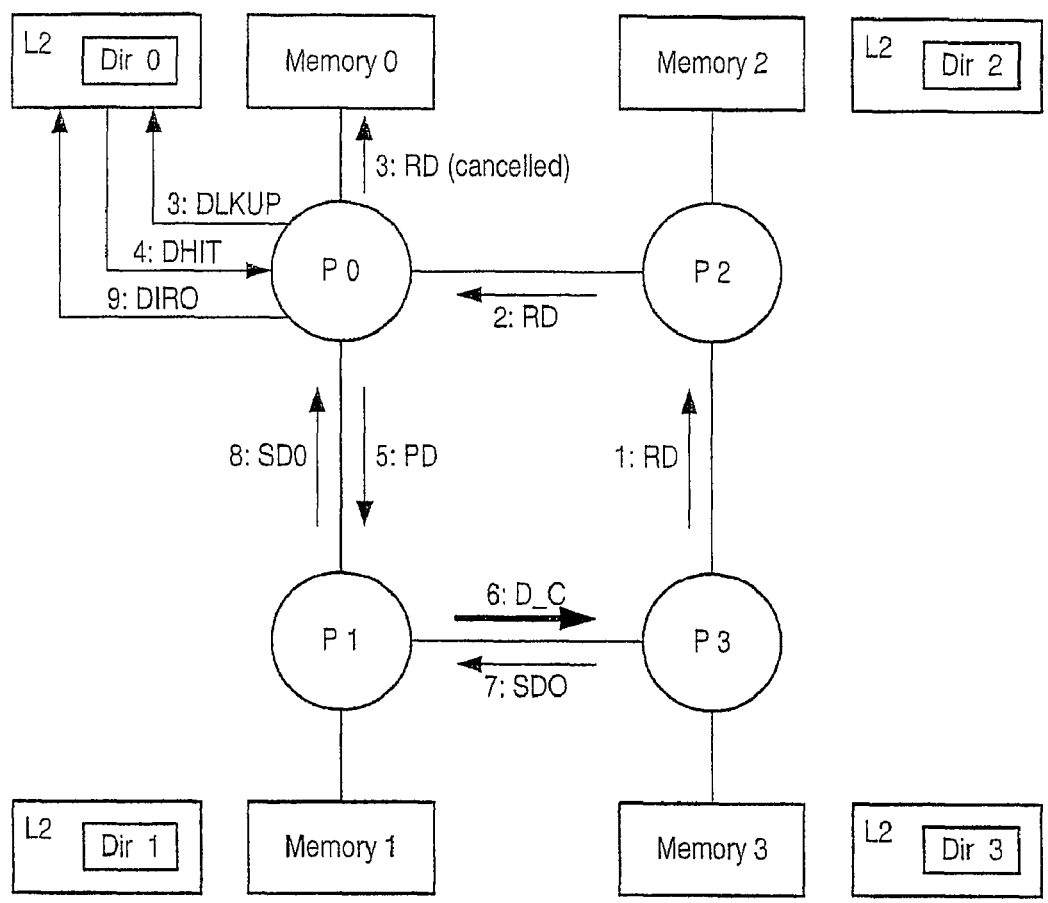

FIGS. 8 and 9 illustrate the manner in which directory entries may be utilized in one embodiment of computer system 10 to filter (or control) probe command and response traffic. In FIGS. 8 and 9, a set of processing nodes P0-P3 is shown, each of which is representative of, for example, a respective processing node 12 of FIG. 1. Each of the processing nodes P0-P3 is shown for illustrative purposes with an associated memory (memories 0-3) and L2 cache. In accordance with the previous description, each of the L2 caches is shown with a respective set of directory entries.

FIG. 8 illustrates an exemplary set of operations which may be performed in response to processing node P3 issuing a read request to a block mapped to memory 0. In this example, the read request (1:RD) results in the block being installed in a shared state in processing node P3. As shown, the memory request is routed to processing node P0 through processing node P2, and a directory lookup (3:DLKUP) is performed by processing node P0 (e.g., by the corresponding coherency control circuit 64, FIG. 4) to determine whether a directory entry exists for the cache block in the cache memory subsystem. In the example of FIG. 8, a directory miss (4:DMISS) occurs in response to the directory lookup. Thus, since a directory entry does not exist, it is possible only that the block is Shared or Invalid in any of the processing nodes' caches. Processing node P0 therefore simply retrieves the data from memory 0 (3:RD), and provides the data (4:D) to processing node P3 through processing node P2. When processing node P3 receives the data, a source done message (7:SD) may be transmitted from processing node P3 to processing node P0 through, for example, processing node P1. This completes the transaction. It is noted that in this example, since the directory lookup resulted in a directory miss, processing node P0 was not required to transmit any invalidating probes to any of the other processor nodes, which would otherwise be required in a system employing a broadcast coherency protocol.

FIG. 9 illustrates a similar example in which processing node P3 issues a read request (1:RD) to a block mapped to memory 0. In this example, however, when processing node P0 performs a directory lookup (3:DLKUP), a directory hit occurs in a corresponding entry of the cache memory (4:DHIT). The directory entry indicates the block is in the ME state in processing node P1. The coherency control circuit of processing node P0 accordingly causes a directed probe command (5:PD) to be forwarded to processing node 1 to cause the processing node 1 to forward the data (6:D_C) to processing node P3. In one embodiment, since the data is installed in processing node P3 in a shared state, the cache controller of processing node P1 will downgrade its cached copy of the block from the state M to O. The target nodes sends a Source Done Owned message (7:SDO) to indicate that the coherency control circuit of processing node P0 must update the directory entry for the block to indicate that it is now cached in the O state in processing node P1. It is noted that in this example since a directory hit occurred for a block in the ME state, processing node P0 was not required to transmit (e.g., broadcast) invalidating probes to any of the processing nodes.

A variety of other specific coherency operations may be invoked in response to other transactions initiated by a processing node. Similar to the foregoing examples, probe command and response traffic may be filtered based upon the existence of a directory entry for a block being accessed, and/or based upon the state of the block as indicated in a directory entry. For example, referring back to FIG. 9, if processing node P3 initiates a read command (1:RD) to receive an exclusive copy of a particular block (e.g., by initiating a RdBlkMod command), processing node P0 may forward a probe command to the processing node P1. The processing node P1 correspondingly forwards the modified data to processing node P3. In addition, the processing node P1 may invalidate its copy, and processing node P0 may update the directory entry for the block to indicate the block is in ME state in processing node P3. Various other specific coherency operations may similarly be performed, as appropriate, depending upon the type of transaction, the existence of a directory entry, and the state of the block in the directory entry.

Many other directory entry formats are possible in other embodiments. The specific format of a directory entry may be based on the amount of state information that is kept, the scalability of the system, and the directory storage overhead, among other factors.

Figure 10:
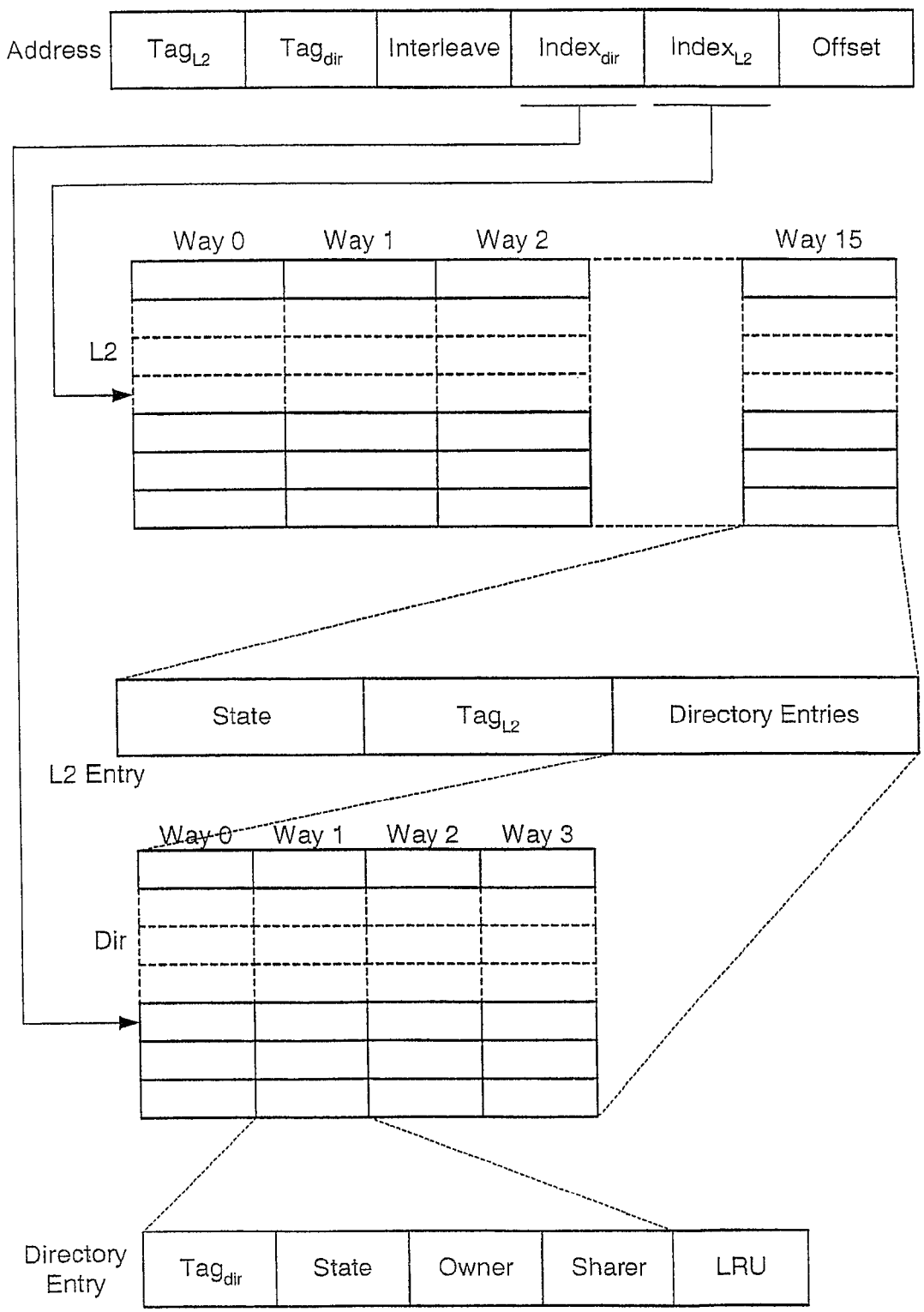
FIG. 10 illustrates a cache arrangement in which directory entries are stored using a 4-way organization.

FIG. 10 illustrates an alternative arrangement in which directory entries are stored using a 4-way cache organization. An LRU field may be maintained to determine the least recently used entry (of a set) to be replaced upon an occurrence of a directory conflict miss (i.e., when a new entry overwrites an existing entry). It is noted that when a directory conflict occurs, the coherency control circuit may invoke certain coherency activities, as needed. For example, in some situations, the cache coherency circuit may cause a node with a modified copy of the block to downgrade the line to Shared by performing a copy-back operation to free up a directory entry.

Figure 11:
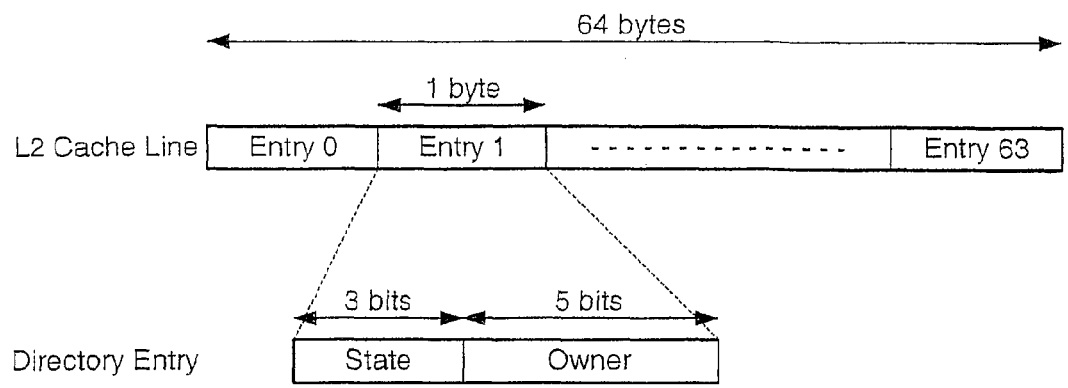
FIGS. 11 and 12 illustrate alternative directory entry formats.
Figure 12:
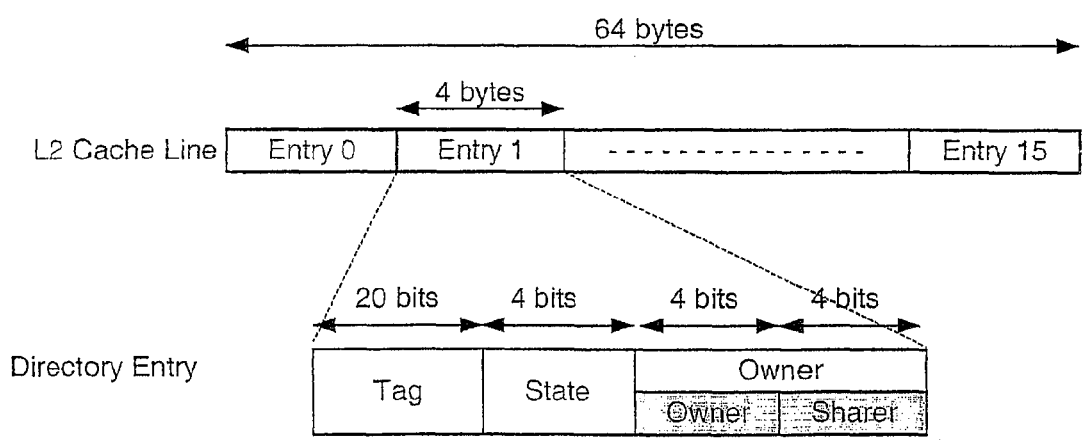

The amount of information maintained in a directory entry may also vary, depending upon the implementation. FIG. 11 illustrates an embodiment in which 64 directory entries may be provided in a 64 byte cache block. In the illustrated example, the 5 bit owner field encodes the owner for ME or O states, sufficient to support 32 processing cores (e.g., 8 nodes with 4 cores each). The directory format of FIG. 12 may be well suited for work loads in which modified blocks exhibit some page locality. FIG. 12 illustrates an embodiment in which 16 directory entries may be provided in a 64 byte cache block. In the illustrated example, a 20 bit address tag is used to determine if a directory access is a hit or miss, and a 4 bit state field encodes the state of the directory entry. The format of the remaining fields depends on the value of the state field. In the P state (described in greater detail below), a 4 bit owner field encodes the owner node, and the 4 bit sharer field encodes the single sharer node, sufficient to support the P state for 16 processing cores. In the ME or O states, an 8 bit field encodes the owner of the line, sufficient to support the ME or O states for 256 processing cores.

It is noted that the specific coherency activities that may be invoked (e.g., probe commands and responses) in response to a given transaction may depend upon the specific coherency scheme employed and the information contained in a corresponding directory entry, if any. Various specific directory-based protocols are possible.

In addition, it is also noted that while in the above embodiment a specific way of cache memory 72 may be used to store directory entries, other embodiments are also possible. For example, embodiments are possible in which designated sets of the cache memory 72 may be used to store directory entries or some fraction of the total entries in a way (e.g., ½) are dedicated to storing directory entries.

Still further, embodiments that do not include mode storage unit 75 are also possible. The information maintained with the cache blocks may include one or more bits that may be set to identify an entry as containing directory information.

Remote Caching

Figure 13:
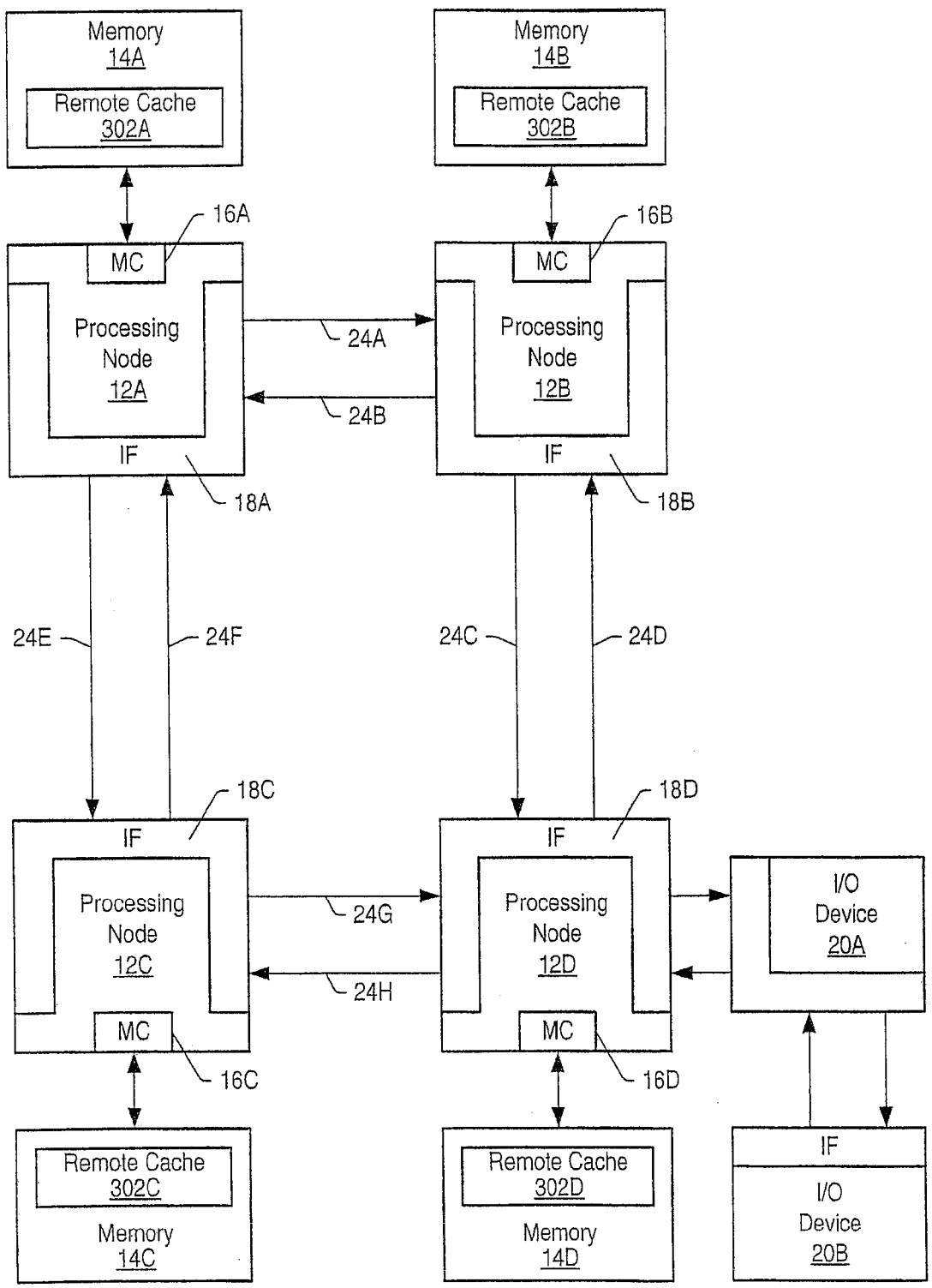
FIG. 13 illustrates another embodiment of a computer system including remote caches.

Turning next to FIG. 13, another embodiment of computer system 10 may include remote caching functionality wherein a portion of the system memory 14 (i.e., 14A-14D) of a given processing node 12 is allocated for remotely caching addresses mapped to the system memory of another node. These remote cache regions are illustrated as remote caches 302A-302D in FIG. 13. Circuit portions in FIG. 13 that correspond to those of FIG. 1 are numbered identically, and may include the same functionality as described above.

Figure 14:
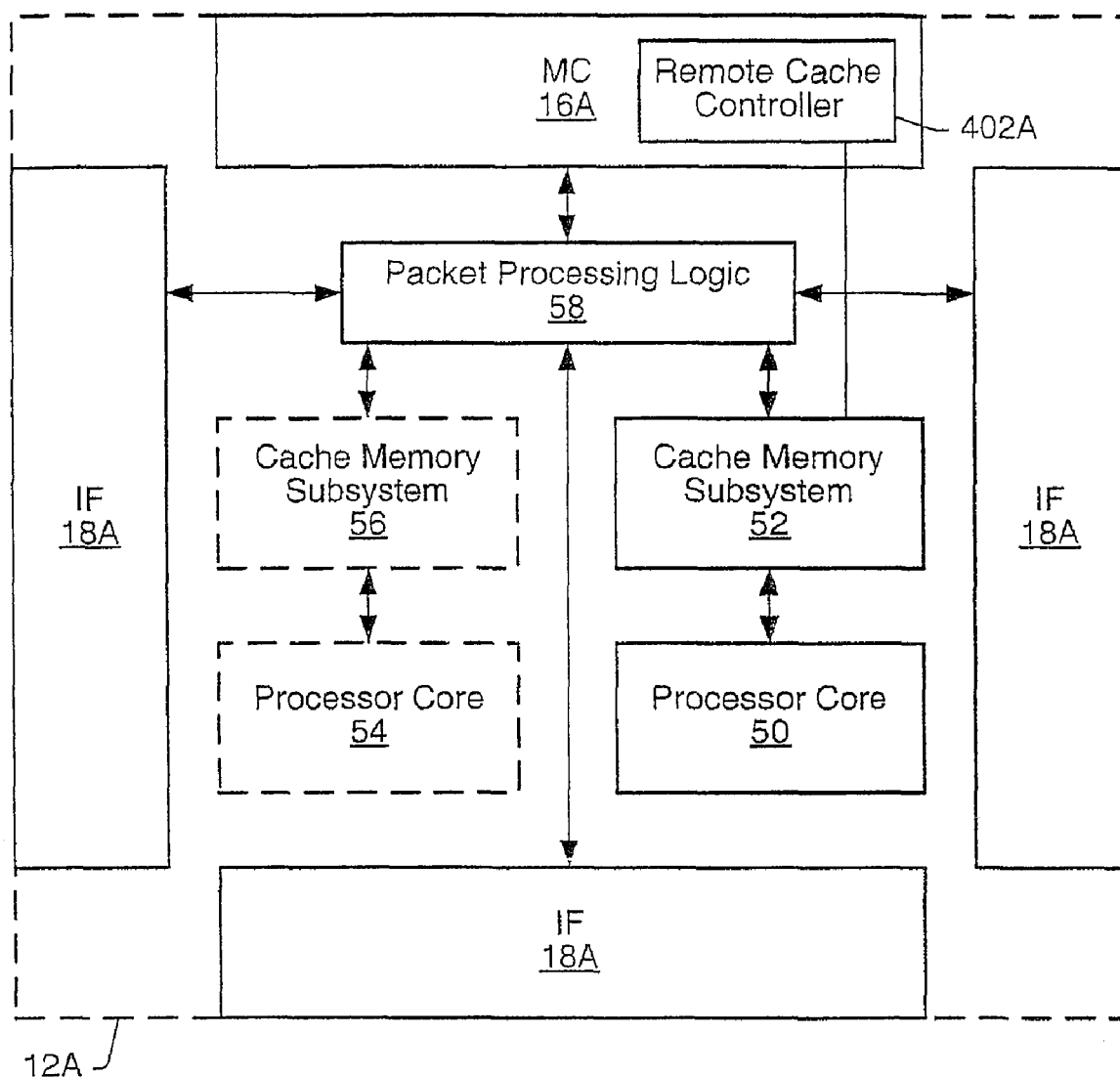
FIG. 14 is a block diagram of another embodiment of a processing node.

The storage of remote data within the remote cache 302 of a given system memory 14 may be controlled by a corresponding remote cache controller 402A, as depicted within the memory controller 16A of FIG. 14. Processing nodes 12B-12D may include similar remote cache controllers. As will be described further below, in one embodiment remote cache controller 402A may include an interface to cache memory subsystem 52 (and/or cache memory subsystem 56). Storage locations within cache memory subsystem 52 may be utilized to store information identifying whether particular addresses are remotely cached by remote cache controller 402A within the corresponding system memory 14A of the corresponding node. Further details regarding this functionality are provided below.

In one embodiment, the remote caching policy employed by remote cache controller 402A is to store only shared remote data. In such an embodiment, Modified, Owned or Exclusive data is not stored in the remote cache 302A. The remote cache 302A may be non-inclusive with respect to the cache memory subsystem 52, and may act as a victim cache for shared blocks being evicted from cache memory subsystem 52 (and cache memory subsystem 56, if desired). As such, the remote cache 302A is written to by remote cache controller 402 only when a shared remote block which is not already present in the remote cache 302A is replaced in cache memory subsystem 52 (and/or cache memory subsystem 56).

Figure 15:
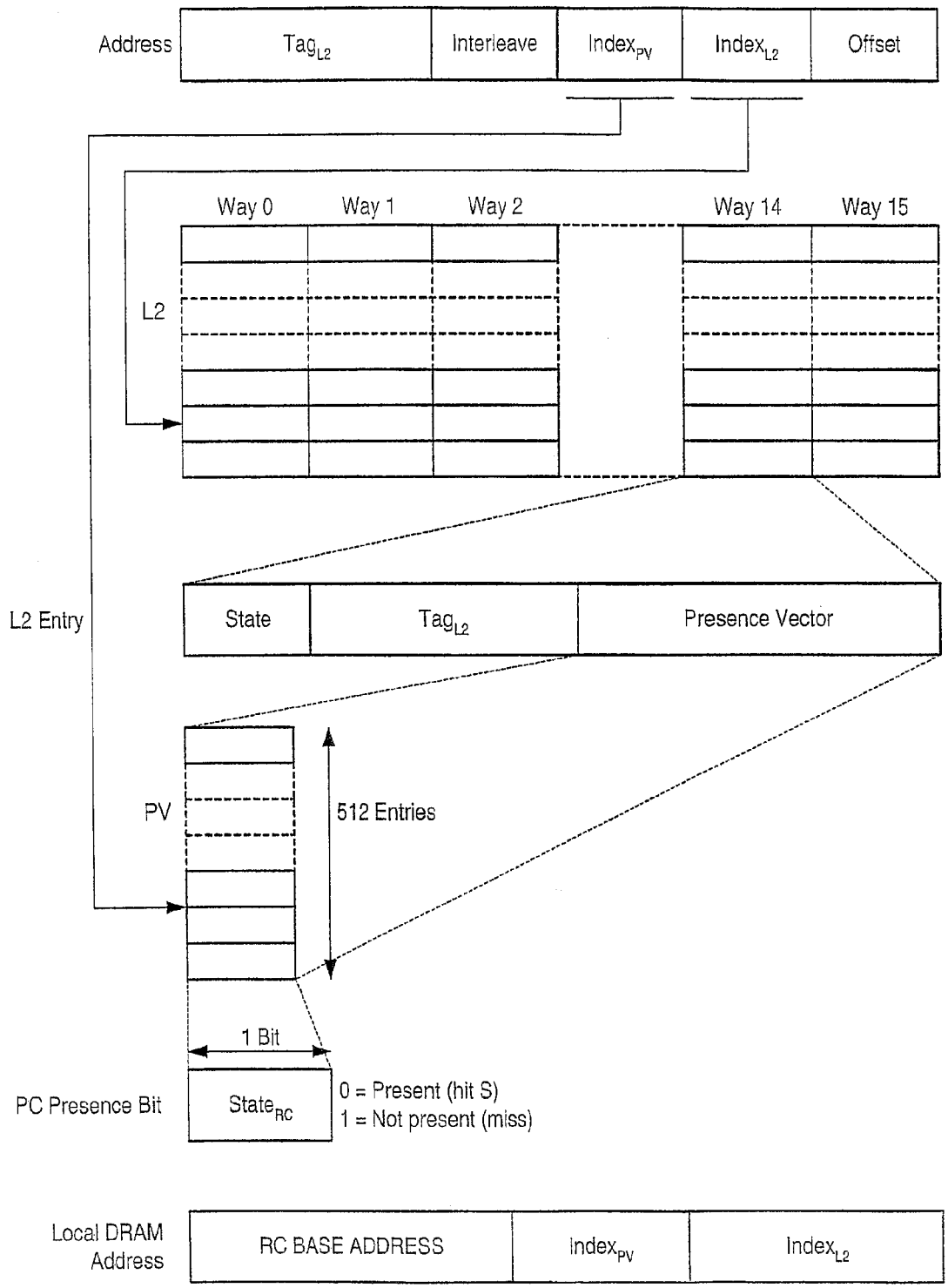
FIG. 15 illustrates an organization of a cache memory subsystem in which a designated way is used to store presence vectors.

FIG. 15 illustrates an organization of cache memory subsystem 52 in which a designated way (e.g., way 14 of the illustrated embodiment) may be used to store presence vectors that contain information identifying whether corresponding remote blocks are cached within remote cache 302. A cache block may include a presence vector including a plurality of entries, each indicating whether a corresponding block is present or not in the remote cache 302A in Shared (S) state. In the embodiment of FIG. 14, each entry consists of a single presence bit. A given presence vector may be accessed in accordance with selected index bits ($Index_{L2}$) of the address used to access the cache memory. Similarly, a presence bit of a given presence vector may be selected using other bits (e.g., $Index_{PV}$) of the address. A presence vector hit occurs when the block tag (e.g., $Tag_{L2}$) stored with the cache block matches corresponding tag bits of the address used to access the cache.

The physical addresses of system memory 14A that are allocated for remote cache 302A may be specified in accordance with an RC base address value stored in a configuration register associated with remote cache controller 402A. Remotely cached blocks within remote cache 302A of memory 14A may accordingly be addressed using the RC base address in conjunction with the bits forming the presence vector index and the L2 index, as depicted.

It is noted that in the embodiment of FIG. 14, installation of a block into remote cache 302A does not require an eviction of Modified or Owned data (or a replacement notification for exclusive data in systems with a directory). In addition, coherency state information may not be required for the remotely cached blocks since the presence bit is sufficient to indicate that a block is both valid and in a shared state. When a shared block is replaced in cache memory subsystem 52 (and cache memory subsystem 56, if desired), the block is installed in remote cache 302A if it is not already present in the remote cache. Because data in the remote cache 302A is never dirty, blocks in the remote cache 302A may be silently replaced, and remote cache evictions may be unnecessary. When another node performs a store or requests an exclusive copy of a block currently in Shared (S) state, the resulting invalidating probe command received by processing node 12A (e.g., from the home node) causes a lookup to be performed in cache memory subsystem 52 to thereby determine whether the block is present either in the remote cache 302A or in cache memory subsystem 52. If a hit occurs indicating the block is shared in either the remote cache 302A or the cache memory subsystem 52, the block is invalidated.

In some embodiments, cache memory subsystem 52 may be used both to store directory entries as described previously, as well as remote cache presence indications. For example, in one embodiment, cache memory subsystem 52 may designate one way (e.g., way 15) for the storage of directory entries (e.g., as illustrated in FIG. 7 or 10), while designating another way (e.g., way 14) for the storage of presence vectors. When used in combination, a single access to cache memory subsystem 52 can be performed to determine whether the data is cached (e.g., in ways 0-13), and whether the data is cached in the remote cache 302A. In addition, when the access is to data mapped to the local node, the access to the cache memory subsystem may additionally determine whether the data is cached in Modified, Owned or Exclusive state in another processor's cache, and if so, which node contains the data. Still further, in the case of a store (or a request from another node to receive an exclusive copy of a data block), a corresponding invalidating probe received by the processing node may result in the simultaneous invalidation of the block both in cache memory 74 (e.g., ways 0-13) and in the remote cache 302A (i.e., by changing the presence bit corresponding to the block in way 14 of the cache memory subsystem).

Figure 16:
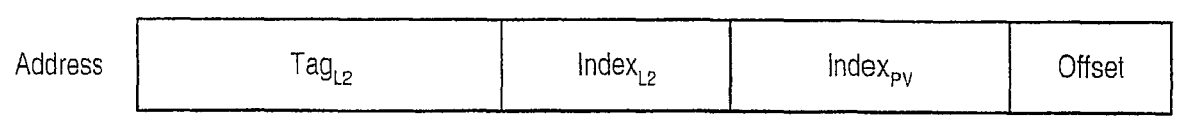

It is noted that in other embodiments, the presence information contained in cache memory subsystem 54 may be stored using other specific organizations. For example, FIG. 16 illustrates an alternative manner in which the cache memory subsystem may be indexed to access a given presence bit.

In addition, it is noted that the use of entries (e.g., a selected way) of cache memory subsystem 52 (and/or cache memory subsystem 56) for the storage of remote cache presence information may be selectively enabled based upon the operating environment. For example, a value stored in mode storage unit 75 may control whether the remote cache presence indication feature is enabled. As such, when deployed in a single-processor environment, the mode storage unit 75 may be set to designate all of the entries of the cache memory subsystem for normal caching operations, thereby avoiding waste of storage resources.

Global, Directory, and Cache Coherence State

In some computer system embodiments including a directory-based cache coherence scheme, such as the examples described above, the coherence state of a given cache data block in a particular cache may differ from the directory state of that cache data block or the state of the cache data block viewed from the perspective of the entire computer system (referred to herein as global state). For example, a given cache data block may be modified in cache memory subsystem 52 of processing node 12A as described above, and its cache state may correspondingly be M (modified). From the perspective of the entire system, the global state of the given cache data block may also be Modified. However, in one embodiment the directory employed by computer system 10 may combine a modified cache coherence state with an exclusive cache coherence state to reduce directory storage requirements as described above. Consequently, the directory state for the given cache data block with a modified cache state may be a combined E/M (exclusive/modified) state.

Similarly, in some embodiments, additional directory states that distinguish specific data usage scenarios from existing cache and/or global states may be defined. Such directory states may improve system performance under certain conditions, as described in greater detail below. Table 1 illustrates the relationship among global, directory, and cache states for one embodiment of a computer system including a directory-based cache coherence protocol.

TABLE 1

Global, directory and cache states

| Global State | Directory State | Cache State | Comment |
| --- | --- | --- | --- |
| Modified (M) | E/M | M | Cache data block is modified in exactly 1 cache |
| Owned (O) | P(airwise shared) | O | Cache data block owned in one cache in O |
|  |  | S | state and shared in exactly one other cache in S state |
|  | O | O | Cache data block owned in one cache in O |
|  |  | S | state and shared in at least 2 other caches in S state |
| Exclusive (E) | E/M | E | The cache data block is exclusive in exactly one cache. The copy in memory is up to date. |
| Shared (S) | Miss | S | The absence of a directory entry (miss) or |
|  | I |  | an invalid directory entry (I) implies cache data block may be shared in at least one cache |

TABLE 1-continued

Global, directory and cache states

| Global State | Directory State | Cache State | Comment |
|---|---|---|---|
| | R(emote) | | Cache data block is present in exactly one Remote Cache in the system |
| Uncached (U) | U | U | Cache data block is not cached |
| migraTory (T) | T | M | Cache data block was pairwise-shared and then modified, is modified in exactly 1 cache, and is subsequently installed in M state upon migrating to a different cache |

As illustrated in Table 1, in addition to the modified cache data block instance just discussed, a given cache data block may be globally Owned, Exclusive, Shared, Uncached, or migraTory in the illustrated embodiment. If a cache data block is globally Owned, then it is stored in one cache with an Owned (O) cache state and at least one cache with a Shared (S) cache state. In some embodiments, the globally Owned state may imply that the Owned cache data block differs with respect to the copy stored in system memory (i.e., that the Owned data is "dirty" or "shared dirty"). In the illustrated embodiment, two directory states may be defined for globally Owned data: in the Owned (O) directory state, the cache data block is in the O cache state in one cache and in the S cache state in at least two other caches. In the Pairwise-shared (P) directory state, which is described in greater detail below, the cache data block is in the O cache state in one cache and in the S cache state in exactly one other cache.

If a cache data block is globally Exclusive, then it is stored in exactly one cache and the copy of the cache data block stored in system memory is up to date with the cache data block (i.e. the globally Exclusive cache data block is "clean"). In the illustrated embodiment, the directory state for such a cache data block is E/M, as for globally Modified data.

If a cache data block is globally Shared, then it is stored in at least one cache with a Shared (S) cache state. In some embodiments, the globally Shared state may imply that the Shared cache data block does not differ with respect to the copy stored in system memory (i.e., that the globally Shared data is "clean" or "shared clean"). In the illustrated embodiment, several directory states may be defined for globally Shared data: as described above, the absence of a directory entry or an invalid directory entry may imply that the corresponding cache data block is shared in at least one cache; such an instance may also imply that the data is uncached. Further, as described in greater detail below, in the Remote (R) directory state the globally Shared cache data block is stored in exactly one remote cache within the system.

If a cache data block is globally Uncached, then it is not cached within any cache within the system, and has a corresponding Uncached (U) directory state as described in greater detail below. Finally, a cache data block may be globally migraTory (T). As described further below, globally migraTory data is data that had previously been globally Shared with a Pairwise-shared directory state and was then modified by the sharer. In the illustrated embodiment, a globally migraTory cache data block has a migraTory (T) directory state and a modified (M) cache state, and if such data migrates to a different cache, it is installed in the M cache state in the new cache.

It is contemplated that in other embodiments, different or additional directory states may be defined, as well as different combinations of global, directory, and cache state.

Store Probe Filtering for Uncached Coherence State

In one embodiment, computer system 10 of FIG. 1 or FIG. 13 may still require probe transactions and associated cache coherency protocol overhead activity even though a directory structure may be employed. For example, in an embodiment that employs the MOESI coherence protocol described above, a cache data block may be in the Modified (M) cache state in a given processing node 12 after initiating a first store operation to that cache data block. The modified cache data block may be evicted from a cache, written back to a system memory 14 of and replaced with a different cache data block due to capacity constraints. After eviction, the cache state associated with the evicted data block may transition to Invalid (I) for the given processing node from which the cache data block was evicted. Subsequent to eviction, the given processing node 12 or another processing node may initiate a second store operation to the evicted cache data block. Meanwhile, another processing node may have read the evicted cache data block and transitioned its coherence state to a Shared (S) cache state for the reading node.

If a directory structure is employed in computer system 10, it may not track each sharer of a given cache data block in some embodiments, thus reducing the resources required to implement a given directory entry. In such an embodiment, invalidating probes may be sent to all processing nodes 12 in the system after the second store operation described above is initiated, thereby ensuring that the processing node performing the second store operation includes the most current copy of the relevant cache data block in the system. The probe traffic associated with the second store operation may reduce the performance of computer system 10 by increasing congestion on the interconnect network between nodes as well as by causing the probe-issuing processing node to wait for probe responses from each other processing node, which responses may have a longer latency for distant nodes.

In one embodiment, processing nodes 12 of computer system 10 may implement an additional directory state referred to herein as the Uncached (U) state. In some embodiments, the U state may be implemented in addition to the global states defined in the MOESI protocol and may be a distinct directory state from an Invalid state. For example, coherency control circuit 64 of FIG. 4 may be configured to process transactions involving the Uncached directory state along with other implemented directory states, and the state field of the directory entries illustrated in FIG. 7 and FIGS. 10-12 may be configured to store an indication of the Uncached directory state. Alternative embodiments are contemplated in which the Uncached directory state is implemented with different numbers and kinds of other cache coherence states.

A given home node 12 of computer system 10 may be configured to transition a directory entry of a corresponding modified cache data block to the Uncached directory state in response to a processing node 12 evicting the modified cache data block from its cache. An embodiment of computer system 10 including a directory structure may retain the identity of the processing node performing the eviction as the owner of the evicted cache data block within the relevant directory entry upon transitioning the evicted cache data block to the Uncached state. As described in greater detail below, the Uncached directory state may enable certain store probe transactions to be filtered, thereby improving system performance.

In some cache coherency protocol embodiments, modified-state data may only exist in one cache in a system such as computer system 10. After modified data is evicted from a cache, the Uncached directory state may indicate that the associated data is uncached anywhere within computer system 10. Therefore, when the evicting processing node 12 performs a second store operation to the evicted, uncached-state cache data block as described above, the home node 12 corresponding to the cache data block may transition the directory state of the relevant cache data block from the Uncached directory state to a Modified or Modified/Exclusive directory state without issuing probes to other processing nodes within computer system 10. Additionally, the evicting processing node may reinstall the evicted cache data block in a Modified cache state rather than an Invalid or Exclusive cache state.

Alternatively, when a processing node 12 other than the evicting processing node performs a store operation to an uncached-state cache data block in an embodiment including a coherence directory, the corresponding home node 12 may update the relevant directory entry to reflect the current owner and may transition the directory state of the relevant cache data block from Uncached to Modified or Modified/Exclusive without issuing probes to other processing nodes within computer system 10. Similarly, the cache data block may be reinstalled in a Modified cache state rather than another cache state.

Figure 17:
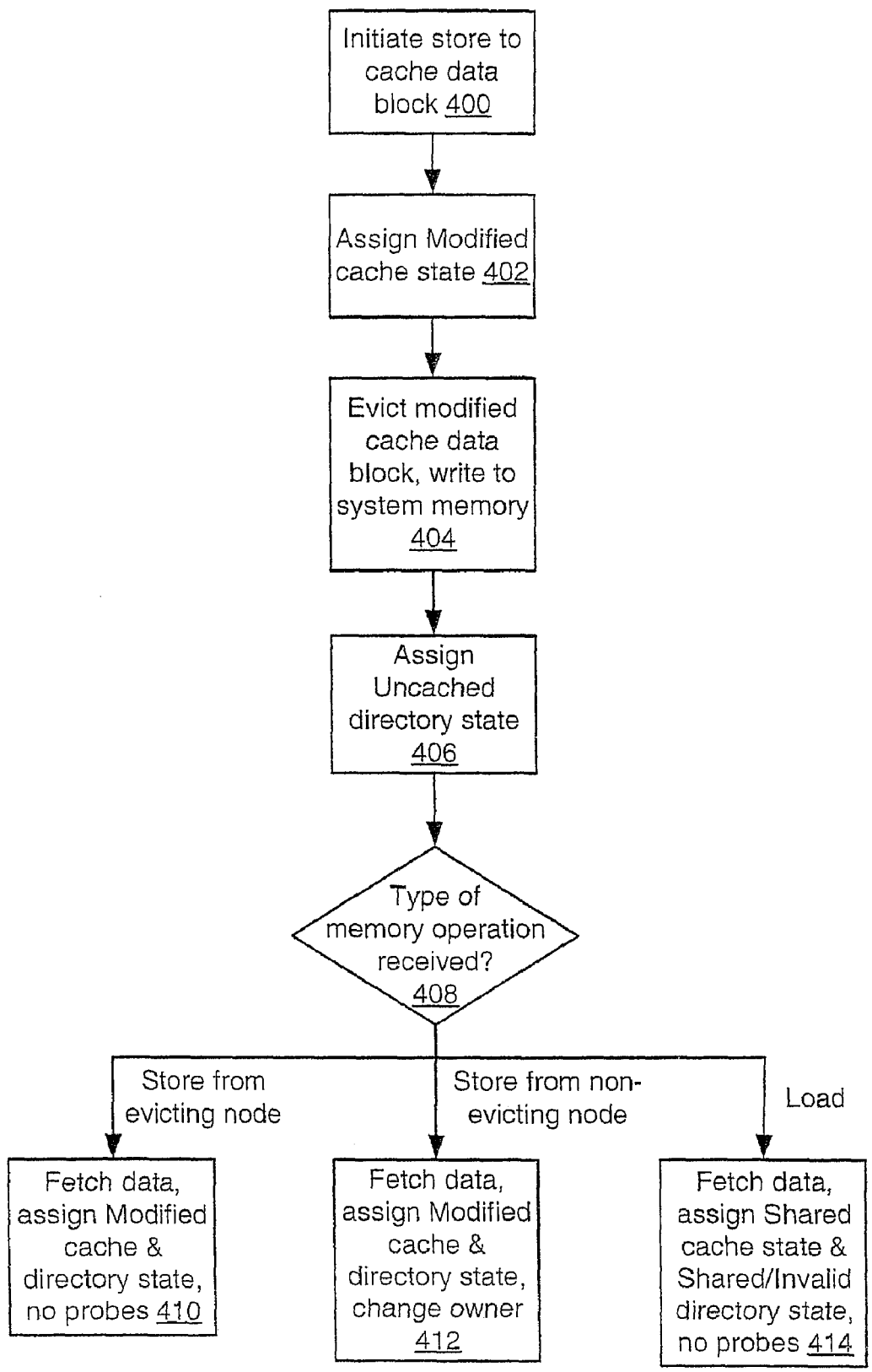
FIG. 17 illustrates the operation of one embodiment of a computer system with respect to an uncached directory state.

FIG. 17 illustrates the operation of an embodiment of computer system 10 with respect to an Uncached directory state. Referring collectively to FIGS. 1-3 and FIG. 17, operation begins in block 400 where a given processing node such as processing node 12A initiates a first store operation to a cache data block stored in a cache such as cache memory subsystem 52. It is noted that in one embodiment, a store operation may be initiated by executing a packet-based command from table 38 such as RdBlkMod, ChangeToDirty, or ValidateBlk, for example, while in other embodiments, it is contemplated that other operations or commands may be defined as initiating a store operation. Further, while specific processing nodes may be referred to for simplicity, the operation illustrated by FIG. 17 may be understood to apply for any given processing node 12, including embodiments of computer system 10 having differing numbers of processing nodes 12.

In response to initiating the first store operation, processing node 12A may assign a Modified cache state to the cache data block. In one embodiment, the home node may issue probes to the other processing nodes 12, for example if the prior directory state of the relevant cache data block was Shared or Owned/Shared (block 402).

Subsequent to initiating the first store operation, processing node 12A may evict the relevant cache data block modified by the first store operation from cache memory subsystem 52. In one embodiment, the evicted data may be written back to the appropriate system memory 14 of the corresponding home node 12 (block 404). In response to this eviction, an Uncached directory state may be assigned to the cache data block in its corresponding directory entry (block 406). In one embodiment, the directory entry may be stored at the home node 12 associated with the system memory 14 to which the evicted data was written back.

Subsequent to the eviction of the cache data block, a first load operation or a second store operation to the cache data block may occur. Either operation may originate from processing node 12A or from another processing node (block 408). If a second store operation occurs, processing node 12A (i.e., the evicting node) may fetch the cache data block contents from system memory 14 of home node 12 and may assign a Modified cache state to the cache data block. Additionally, in one embodiment home node 12 may assign a Modified or Modified/Exclusive directory state to the directory entry corresponding to the cache data block without issuing probes to other processing nodes (block 410).

If the second store operation does not originate from processing node 12A (i.e., the second store operation originates from a node other than the evicting node), the originating node may initiate the cache data block fetch from the home node and assign a Modified cache state to the cache data block. Also, in one embodiment the home node may update the owner field of the directory entry corresponding to the cache data block to reflect that the node originating the second store operation is now the new owner of the cache data block, and may assign a Modified or Modified/Exclusive directory state to the directory entry corresponding to the cache data block without issuing probes to other processing nodes (block 412). It is noted that in one embodiment, the second store operation may not include a ChangeToDirty operation, because such an operation may imply that the cache data block to be written is already present in a cache, whereas in such an embodiment the Uncached state may imply that a cache data block is not present in a cache.

If a first load operation to the cache data block occurs subsequent to eviction of the cache data block, in one embodiment processing node 12A may fetch the cache data block contents from home node 12 and assign a Shared cache state to the cache data block. Further, in one embodiment home node 12 may assign an Invalid directory state to the cache data block or may deallocate the corresponding directory entry without issuing probes to other processing nodes. For example, computer system 10 may implement a sparse directory coherence scheme as described above, in which the absence of a directory entry or an invalid directory entry for a corresponding cache data block may imply that the cache data block is globally Shared or Invalid. In an alternative embodiment, home node 12 may assign a Shared directory state to the cache data block without issuing probes to other nodes in response to the first load operation. If the first load operation does not originate from processing node 12A, the originating node may initiate the cache data block fetch from the home node (block 414).

Store Probe Filtering for Remote Coherence State

As described above in conjunction with the description of FIGS. 13-16, in one embodiment computer system 10 may support remote caching. In such an embodiment a given remote cache 302 may be configured to operate as a victim cache, storing cache data blocks evicted from a respective processing node 12. Like the scenario described above, in one embodiment the coherence state associated with the evicted data block may transition to Invalid (I) for the processing node from which the cache data block was evicted. Subsequent to eviction, the evicting processing node 12 or another processing node may initiate a second store operation to the evicted cache data block. Meanwhile, another processing node may have read the evicted cache data block and transitioned its coherence state to Shared (S) for the reading node. The presence of evicted data in the remote cache of the processing node initiating the second store operation may speed the return of that data to the requesting node, particularly if the evicted data would have otherwise been delivered from a remote system memory. However, in such an embodiment, it may still be necessary to issue probes to one or more nodes in response to the second store operation to ensure coherence, which may impact system performance as described above.

In one embodiment, processing nodes 12 of computer system 10 may implement an additional directory state referred to herein as the Remote (R) state. In some embodiments, the R state may be implemented in addition to the states defined in the MOESI protocol and may be a distinct coherence state from an Invalid state. Coherency control circuit 64 of FIG. 4 may be configured to process transactions involving the Remote state along with other implemented directory states, and the state field of the directory entries illustrated in FIG. 7 and FIGS. 10-12 may be configured to store an indication of the Remote state. Alternative embodiments are contemplated in which the Remote state is implemented with different numbers and kinds of other cache coherence states.

A given home node 12 of computer system 10 may be configured to transition a directory entry of a corresponding modified cache data block to the Remote state in response to a processing node 12 evicting the modified cache data block from its cache and storing the evicted data both in a remote cache 302 and a memory 14 of the cache data block's home node 12. An embodiment of computer system 10 including a directory structure may retain the identity of the processing node performing the eviction as the owner of the evicted cache data block within the relevant directory entry upon transitioning the evicted cache data block to the Remote state. Like the Uncached (U) state discussed previously and as will be described in greater detail below, the Remote state may enable probes to be filtered for certain store transactions, thereby improving system performance.

For some cache coherency protocol embodiments, Modified (M) cache state data may only exist in one cache in a system such as computer system 10. After modified data is evicted from a cache and stored in a remote cache, the Remote state may indicate that the associated data is stored in exactly one remote cache within computer system 10. Therefore, when the evicting processing node 12 performs a second store operation to the evicted, Remote-state cache data block as described above, in one embodiment the corresponding home node 12 may transition the directory state of the relevant cache data block from Remote to Modified or Modified/Exclusive and the evicting processing node 12 may reload the evicted cache data block from the remote cache without issuing probes to other processing nodes within computer system 10. Additionally, the evicting processing node 12 may reinstall the evicted cache data block in a Modified cache state rather than an Invalid or Exclusive cache state.

Alternatively, when a processing node 12 other than the evicting processing node performs a store operation to a Remote-state cache data block in an embodiment including a coherence directory, in one embodiment the corresponding home node 12 may update the relevant directory entry to indicate the new owner, may transition the directory state of the relevant cache data block from Remote to Modified or Modified/Exclusive, and may issue a directed probe to the evicting processing node (rather than performing a broadcast to all processing nodes within the system) indicating that the evicting node should invalidate the evicted cache data block stored in its remote cache. As used herein, a directed probe refers to a probe that is addressed to a specific processing node within a system. In contrast, probes issued to all processing nodes within a system without addressing specific processing nodes may be referred to herein as broadcast probes.

Figure 18:
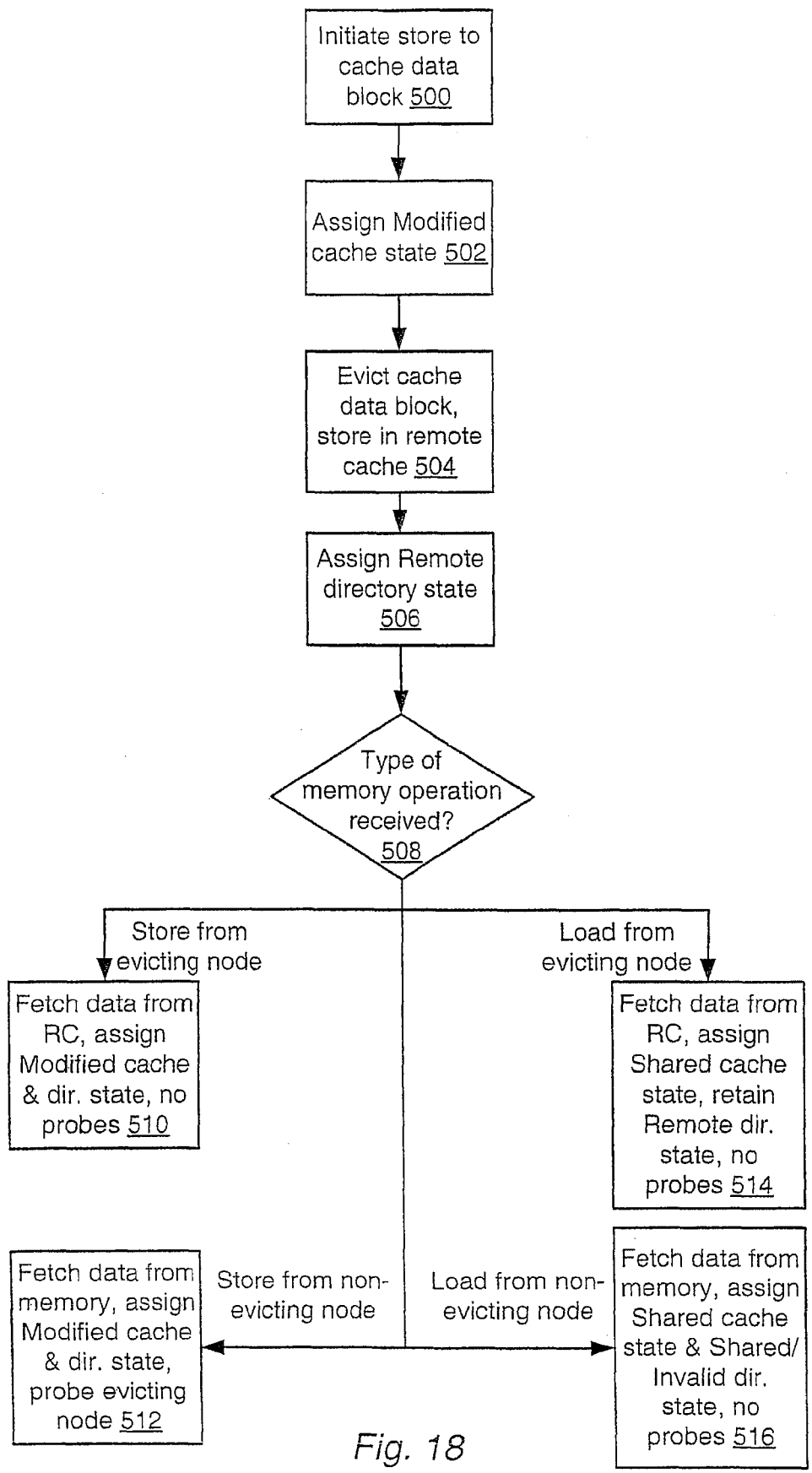
FIG. 18 illustrates the operation of one embodiment of a computer system with respect to a remote directory state.

FIG. 18 illustrates the operation of an embodiment of computer system 10 with respect to a Remote directory state. Referring collectively to FIG. 2, FIGS. 13-14 and FIG. 18, operation begins in block 500 where a given processing node such as processing node 12A initiates a first store operation to a cache data block stored in a cache such as cache memory subsystem 52. It is noted that in one embodiment, a store operation may be initiated by executing a packet-based command from table 38 such as RdBlkMod, ChangeToDirty, or ValidateBlk, for example, while in other embodiments, it is contemplated that other operations or commands may be defined as initiating a store operation. Further, while specific processing nodes may be referred to for simplicity, the operation illustrated by FIG. 18 may be understood to apply for any given processing node 12, including embodiments of computer system 10 having differing numbers of processing nodes 12.

In response to initiating the first store operation, processing node 12A may assign a Modified cache coherence state to the cache data block. In one embodiment, the home node may also issue probes to the other processing nodes 12, for example if the prior directory state of the relevant cache data block was Shared or Owned/Shared (block 502).

Subsequent to initiating the first store operation, processing node 12A may evict the relevant cache data block modified by the first store operation from cache memory subsystem 52. In one embodiment, the evicted data may be written back to the appropriate system memory 14 and stored in a remote cache coupled to processing node 12A, such as remote cache 302A (block 504). In response to the evicted data being stored in a remote cache, the appropriate home node 12 may assign a Remote directory state to the cache data block (block 506).

Subsequent to the eviction of the cache data block, a first load operation or a second store operation to the cache data block may occur. Either operation may originate from processing node 12A or from another processing node (block 508). If a second store operation occurs and originates from processing node 12A (i.e., the evicting node), processing node 12A may restore the cache data block contents from remote cache 302A and may assign a Modified cache coherence state to the cache data block. Additionally, in one embodiment the appropriate home node 12 may assign a Modified or Modified/Exclusive directory state to the cache data block without issuing probes to other processing nodes (block 510).

If a second store operation does not originate from processing node 12A (i.e., the second store operation originates from a node other than the evicting node), the originating node may initiate the cache data block fetch from memory and assign a Modified cache coherence state to the cache data block. Further, in one embodiment the home node may assign a Modified or Modified/Exclusive directory state to the cache data block, may update the owner field of a directory entry corresponding to the cache data block to reflect that the node originating the second store operation is the current owner of the cache data block, and may issue a directed probe to the evicting node to cause it to deallocate the stale cache data block from its remote cache (block 512).

If a first load operation to the cache data block originates from processing node 12A subsequent to eviction of the cache data block, in one embodiment processing node 12A may restore the cache data block contents from remote cache 302A. In one embodiment, the home node may retain the Remote directory state assigned to the cache data block without issuing probes to other processing nodes, indicating that the evicted data remains cached in the remote cache (block 514).

If a first load operation to the cache data block originates from a node other than processing node 12A (i.e., other than the evicting node) subsequent to eviction of the cache data block, in one embodiment the originating processing node may restore the cache data block contents from the appropriate system memory 14 of the home node and may assign a Shared cache coherence state to the cache data block. Further, in one embodiment the home node may assign an Invalid directory state to the cache data block or may deallocate the corresponding directory entry without issuing probes to other processing nodes. For example, computer system 10 may implement a sparse directory coherence scheme as described above, in which the absence of a directory entry or an invalid directory entry for a corresponding cache data block may imply that the cache data block is globally Shared or Invalid. In an alternative embodiment, the home node may assign a Shared directory state to the cache data block without issuing probes to other nodes in response to the first load operation (block 516).

It is noted that in one embodiment, the foregoing steps may operate in an embodiment of computer system 10 that combines a broadcast coherence mechanism with a directory structure, while still achieving a reduction in probe broadcast traffic for stores to evicted data. It is further noted that in one embodiment, the Uncached directory state and the Remote directory state may be mutually exclusive, such that if remote caching is disabled or not present, the Uncached state may be used exclusively upon cache data block eviction, and if remote caching is enabled, the Remote state may be used exclusively upon cache data block eviction.

Store Probe Filtering for Pairwise-Shared Coherence State

In addition to the cache data block eviction cases described above, other memory transaction patterns may benefit from introducing new directory states that may be used to reduce probe traffic. For example, in one embodiment of computer system 10, a frequent memory transaction pattern for certain applications may be for a data element to be read and modified by pairs of processing nodes 12. That is, at a given time during the use of the data element, its corresponding cache data block may be in the Modified (M) cache coherence state in one of a pair of processing nodes 12, and subsequently in the Owned (O) cache coherence state in one of the pair and in the Shared (S) cache coherence state in the other of the pair.

In an embodiment of computer system 10 employing a conventional coherence protocol such as MOESI, if a first load operation is initiated by the non-owning processing node of the pair (referred to herein as the sharer node), the sharer node may issue a probe to obtain the most recent copy of the cache data block from the processing node that has the cache data block in the Modified state (referred to herein as the owner node). As a result, the owner node may transition its copy of the cache data block to the Owned state, and the sharer node may transition its copy of the cache data block to the Shared state. Subsequently, either the owner node or the sharer node may initiate a second store operation to the cache data block. (As the cache data block had previously been in the Modified state, at least a first store operation to that cache data block has occurred.)

If a directory structure is employed in computer system 10, it may not track each sharer of a given cache data block in some embodiments, thus reducing the resources required to implement a given directory entry. Therefore, in such embodiments, neither the owner node nor the sharer node may have information regarding all the nodes that may be sharing the cache data block at the time the store operation is initiated. In such embodiments, the node initiating the store operation may issue invalidating probes to all processing nodes 12 in the system after the second store operation described above is initiated, thereby ensuring that the processing node initiating the store operation includes the most current copy of the relevant cache data block in the system. This additional probe traffic may reduce the performance of computer system 10 as described above.

In one embodiment, processing nodes 12 of computer system 10 may implement an additional directory state referred to herein as the Pairwise-shared (P) state. In some embodiments, the P state may be implemented in addition to the states defined in the MOESI protocol and may be a distinct coherence state from an Owned state. In one embodiment, coherency control circuit 64 of FIG. 4 may be configured to process transactions involving the Pairwise-shared state along with other implemented directory states, and the state field of the directory entries illustrated in FIG. 7 and FIGS. 10-12 may be configured to store an indication of the Pairwise-shared state. Alternative embodiments are contemplated in which the Pairwise-shared state is implemented with different numbers and kinds of other cache coherence states.

A given home node 12 of computer system 10 may be configured to transition a directory entry of a corresponding modified cache data block to the Pairwise-shared directory state in response to a processing node other than the owner initiating a load operation to the modified data block. In one embodiment, transitioning a cache data block to the Pairwise-shared state may include storing the identity of the processing node originally having the cache data block in the Modified state as the owner node, and storing the identity of the processing node initiating the load operation as the sharer node. In one embodiment, the owner field of the directory entry corresponding to the cache data block, such as the directory entries illustrated in the embodiments of FIG. 7 and FIGS. 10-12, may be subdivided into fields indicating the identity of the owner and sharer nodes respectively. As described in greater detail below, the Pairwise-shared state may enable certain store probe transactions to be filtered, thereby improving system performance.

The Pairwise-shared state may indicate that a given cache data block is in use in two processing nodes as well as the identity of those nodes. If an owner node initiates a second store operation to a cache data block in the Pairwise-shared directory state, the owner node may transition the cache coherence state of that cache data block from Owned to Modified while the appropriate home node issues a directed probe only to the sharer node indicated by the directory entry corresponding to the cache data block. Likewise, if a sharer node initiates a second store operation to a cache data block in the Pairwise-shared directory state, the sharer node may transition the cache coherence state of that cache data block from Shared to Modified while the appropriate home node issues a directed probe only to the owner node indicated by the directory entry corresponding to the cache data block. In case of a second store operation from either the owner or sharer node, in one embodiment the appropriate home node may transition the directory state of the cache data block to a Modified or Modified/Exclusive directory state. As described in greater detail below, in another embodiment if a second store operation originates from the sharer node, the appropriate home node may transition the directory state of the cache data block to a migraTory directory state.

Figure 19:
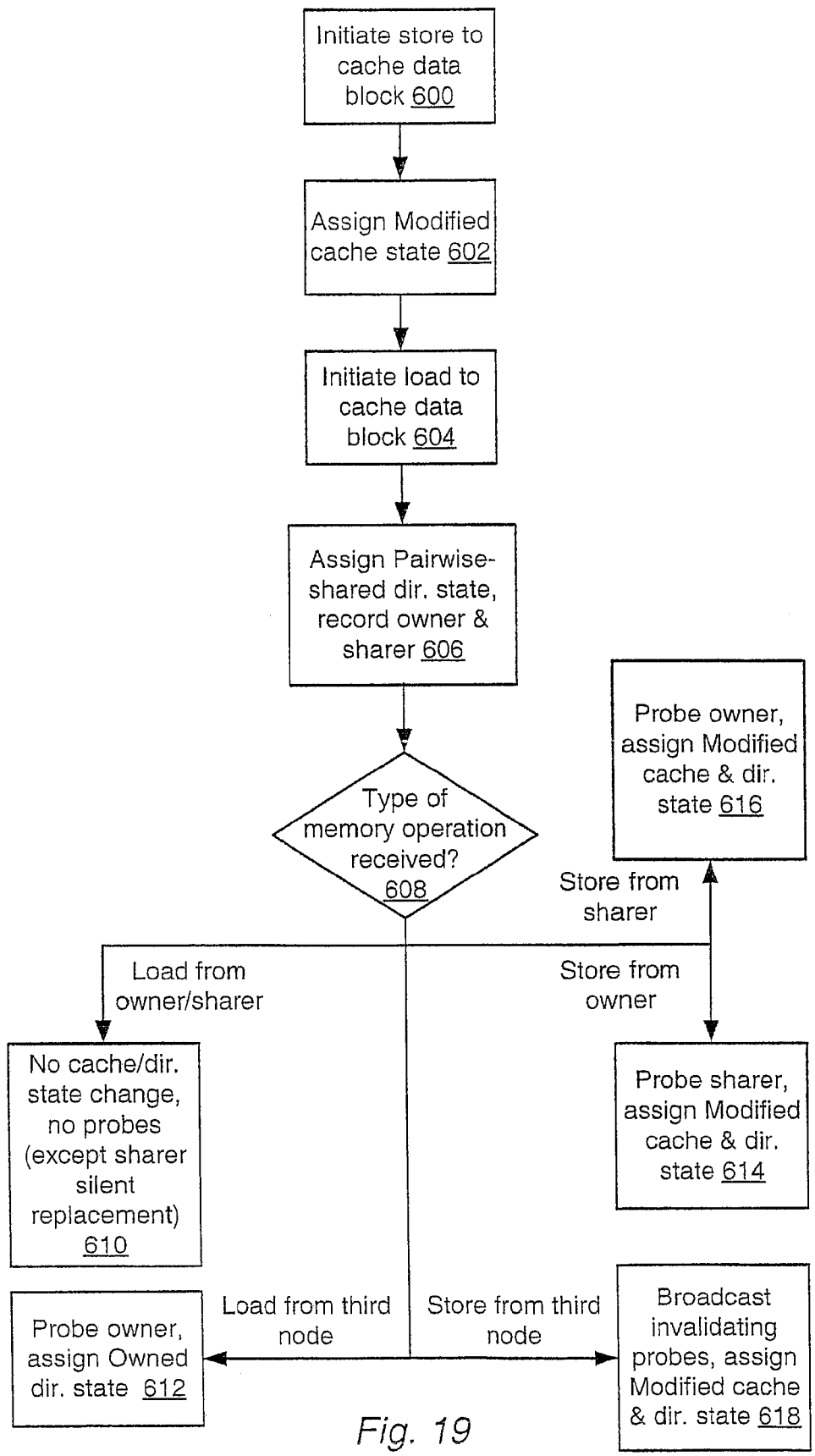
FIG. 19 illustrates the operation of one embodiment of a computer system with respect to a pairwise-shared directory state.

FIG. 19 illustrates the operation of an embodiment of computer system 10 with respect to a Pairwise-shared directory state. Referring collectively to FIGS. 1-3 and FIG. 19, operation begins in block 600 where a given processing node such as processing node 12A initiates a first store operation to a cache data block stored in a cache such as cache memory subsystem 52. It is noted that in one embodiment, a store operation may be initiated by executing a packet-based command from table 38 such as RdBlkMod, ChangeToDirty, or ValidateBlk, for example, while in other embodiments, it is contemplated that other operations or commands may be defined as initiating a store operation. Further, while specific processing nodes may be referred to for simplicity, the operation illustrated by FIG. 19 may be understood to apply for any given processing node 12, including embodiments of computer system 10 having differing numbers of processing nodes 12. Finally, in one embodiment the Pairwise-shared directory state may be implemented in a system including a remote cache as shown in the embodiments illustrated in FIGS. 13-15.

In response to initiating the first store operation, processing node 12A may assign a Modified cache coherence state to the cache data block. In one embodiment, the home node may also issue probes to the other processing nodes 12, for example if the prior directory state of the relevant cache data block was Shared or Owned/Shared (block 602).

Subsequent to the first store operation, processing node 12B may initiate a first load operation to the same cache data block (block 604). In response to the initiation of the first load operation, the appropriate home node 12 may assign a Pairwise-shared directory state to the cache data block, processing node 12A may assign an Owned cache state to the cache data block, and processing node 12B may assign a Shared cache state to the cache data block. Additionally, the identity of processing node 12A as the owner node and the identity of processing node 12B as the sharer node may be recorded in the directory entry corresponding to the cache data block (block 606).

Subsequent to the assignment of a Pairwise-shared directory state to the cache data block, a second load operation or a second store operation to the cache data block may be initiated. Either operation may originate from the owner node, the sharer node, or from a third processing node that is neither the owner nor the sharer node (block 608). If a second load operation originates from either the owner or sharer node, the cache data block may remain in the Pairwise-shared directory state, the respective cache states of the cache data block in the owner and sharer nodes may remain unchanged, and in general no probes may be issued. In one embodiment, the sharer node may silently replace the Pairwise-shared cache data block with a different data block. In such a case, a load from the sharer node may result in a directed probe to the owner node to retrieve a copy of the cache data block (block 610).

If a second load operation originates from a third processing node, the appropriate home node 12 may issue a probe to the owner node to retrieve the cache data block on behalf of the third node and may transition the directory state of the cache data block from Pairwise-shared to Owned or Owned/Shared. In one embodiment, the respective cache states of the cache data block in the owner and sharer nodes may remain unchanged, and a Shared cache state may be assigned to the cache data block in the third node (block 612).

If a second store operation originates from the owner node, the home node may issue a directed invalidating probe only to the sharer node on behalf of the owner node, and the owner node may assign a Modified cache coherence state to the cache data block. The directory state of the cache data block may also transition to Modified or Modified/Exclusive (block 614). Similarly, if a second store operation originates from the sharer node, the home node may issue a directed invalidating probe only to the owner node on behalf of the sharer node, and the sharer node may assign a Modified cache coherence state to the cache data block. The directory state of the cache data block may also transition to Modified or Modified/Exclusive (block 616).

If a second store operation originates from a third processing node, in one embodiment the home node may issue directed probes only to the sharer node and owner node on behalf of the third processing node. In an alternative embodiment, the home node may broadcast probes to all processing nodes in the system in response to initiating a second store operation. In either case, the home node may assign a Modified or Modified/Exclusive directory state to the cache data block, and the third processing node may assign a Modified cache coherence state to the cache data block (block 618).

Store Probe Filtering for Migratory Coherence State

In one embodiment of computer system 10, another frequent memory transaction pattern for certain applications may be for a data element to be read and modified by a number of processing nodes 12 in a sequence. That is, a data element may be read and modified by a first processing node, then read and modified by a second processing node, then read and modified by a third processing node, and so forth. Such a transaction pattern may be referred to herein as a migratory pattern. Further, such a pattern may initially resemble the pairwise-shared transaction pattern described above, except that a third processing node (rather than the first processing node) may read and modify the migratory data after the second processing node.

In one embodiment of computer system 10 employing a Pairwise-shared directory state as described above, a second load operation to a cache data block in the Pairwise-shared directory state that is initiated by a third processing node that is neither the sharer node nor the owner node may cause the cache data block to transition to a Shared (S) cache coherence state in the third node and an Owned (O) cache coherence state in the owner node. The third processing node may then initiate a store operation to the cache data block subsequent to the second load operation in a migratory fashion.

If a directory structure is employed in computer system 10, it may not track each sharer of a given cache data block in some embodiments, thus reducing the resources required to implement a given directory entry. In such embodiments, the third processing node upon initiating the store operation may issue invalidating probes to all processing nodes 12 in the system, thereby ensuring that the third processing node includes the most current copy of the relevant cache data block in the system. This additional probe traffic may reduce the performance of computer system 10 as described above.

In one embodiment, processing nodes 12 of computer system 10 may implement an additional directory state referred to herein as the migraTory state (T). In some embodiments, the migraTory state may be implemented in addition to the 5 global states defined in the MOESI protocol and described above, as well as in addition to the Pairwise-shared (P), Uncached (U), and Remote (R) directory states. The migraTory state may be a distinct directory state from a Modified or Modified/Exclusive directory state. For example, in one embodiment coherency control circuit 64 of FIG. 4 may be configured to process transactions involving the migraTory state along with other implemented directory states, and the state field of the directory entries illustrated in FIG. 7 and FIGS. 10-12 may be configured to store an indication of the migraTory state. Alternative embodiments are contemplated in which the migraTory state is implemented with different numbers and kinds of other cache coherence states.

A given home node 12 of computer system 10 may be configured to transition a corresponding Pairwise-shared cache data block to the migraTory directory state in response to the sharer node initiating a store operation to the Pairwise-shared data block. In one embodiment, transitioning a cache data block to the migraTory state may include storing or retaining the identity of the sharer node as the new owner of the cache data block. It is noted that the current owner of a cache data block in the migraTory directory state may also be referred to herein as the migratory owner. In one embodiment, a cache data block in the migraTory directory state may have a Modified cache state in the migratory owner node. As described in greater detail below, the migraTory state may enable certain store probe transactions to be filtered, thereby improving system performance.

The migraTory state may indicate that a given cache data block is migratory in nature as well as providing an indication of the processing node that most recently modified the cache data block. In one embodiment, loads and stores initiated by the migratory owner node to a corresponding cache data block in the migraTory directory state may have no effect on the cache state or directory state of the cache data block. In one embodiment, if a processing node other than the migratory owner node initiates a load operation subsequent to the cache data block transitioning to a migraTory state, the home node may transition the cache data block back to the Pairwise-shared directory state. However, in an alternative embodiment, if a second processing node other than the migratory owner node initiates a load or store to the cache data block, the home node may retain the migraTory state of the cache data block, issue a directed invalidating probe to the current migratory owner node, and update the directory entry to indicate that the second processing node is the new migratory owner node. Further, the cache data block may be installed in the new migratory owner node in a Modified cache state.

Figure 20:
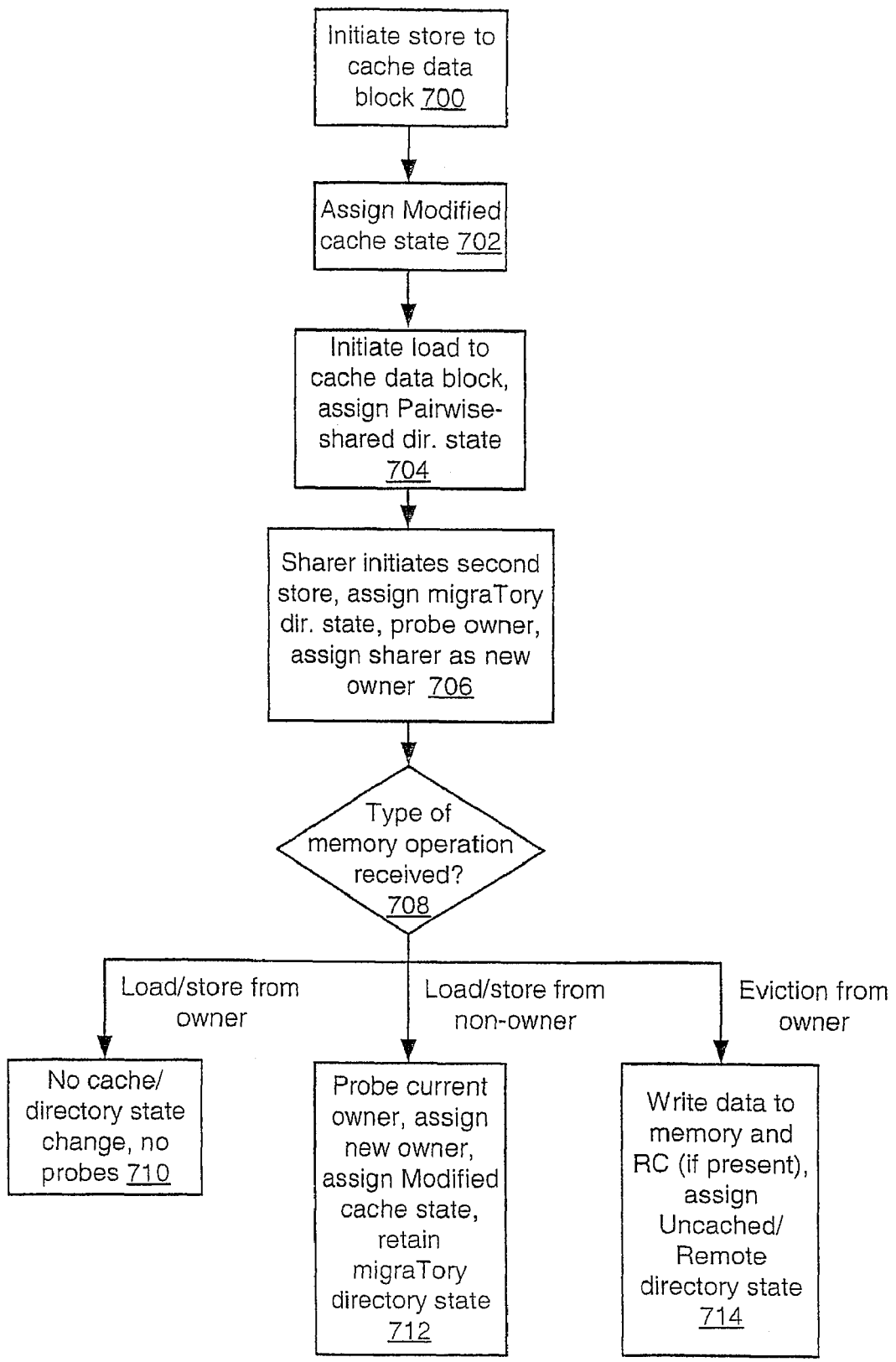
FIG. 20 illustrates the operation of one embodiment of a computer system with respect to a migratory directory state.

FIG. 20 illustrates the operation of an embodiment of computer system 10 with respect to a migraTory directory state. Referring collectively to FIGS. 1-3 and FIG. 20, operation begins in block 700 where a given processing node such as processing node 12A initiates a first store operation to a cache data block stored in a cache such as cache memory subsystem 52. It is noted that in one embodiment, a store operation may be initiated by executing a packet-based command from table 38 such as RdBlkMod, ChangeToDirty, or ValidateBlk, for example, while in other embodiments, it is contemplated that other operations or commands may be defined as initiating a store operation. Further, while specific processing nodes may be referred to for simplicity, the operation illustrated by FIG. 20 may be understood to apply for any given processing node 12, including embodiments of computer system 10 having differing numbers of processing nodes 12. Finally, in one embodiment the migraTory directory state may be implemented in a system including a remote cache as shown in the embodiments illustrated in FIGS. 13-15.

In response to initiating the first store operation, processing node 12A may assign a Modified cache coherence state to the cache data block. In one embodiment, the home node may also issue probes to the other processing nodes 12, for example if the prior directory state of the relevant cache data block was Shared (block 702).

Subsequent to the first store operation, processing node 12B may initiate a first load operation to the same cache data block. In response to the initiation of the first load operation, the appropriate home node 12 may assign a Pairwise-shared directory state to the cache data block, processing node 12A may assign an Owned cache state to the cache data block, and processing node 12B may assign a Shared cache state to the cache data block. Additionally, the identity of processing node 12A as the owner node and the identity of processing node 12B as the sharer node may be recorded in the directory entry corresponding to the cache data block (block 704).

Subsequent to the assignment of a Pairwise-shared directory state to the cache data block, processing node 12B (i.e., the sharer node) may initiate a second store operation to the cache data block. In response to the second store operation, the appropriate home node may assign a migraTory directory state to the cache data block, may direct an invalidating probe only to the owner node, and may update the directory to indicate that processing node 12B is the current migratory owner of the cache data block. Further, the cache data block may be installed in processing node 12B in the Modified cache state (block 706).

Subsequent to the assignment of a migraTory directory state, a second load operation or a third store operation to the cache data block may be initiated, or the cache data block may be evicted from the current migratory owner (block 708). If either a second load operation or a third store operation originates from the current migratory owner node, the cache data block may remain in the migraTory directory state. Further, there may be no change to the cache state, and no probes may be issued (block 710).

If either a second load or a third store operation originates from any processing node other than the current migratory owner node, the appropriate home node may retain the migraTory directory state assigned to the cache data block, may issue a directed invalidating probe to the current migratory owner node, and may update the directory entry to reflect that the originating node is the new migratory owner. Additionally, the cache data block may be installed in the Modified cache state in the new migratory owner node (block 712).

If the cache data block is evicted from the current migratory owner, the cache data block may be written back to the appropriate home node. Additionally, in one embodiment the data may be stored in a remote cache as described above. In response to the eviction, the appropriate home node may assign an Uncached (U) or Remote (R) directory state to the cache data block (block 714).

With respect to each of the directory states described above in conjunction with the descriptions of FIGS. 17-20, it is noted that in some directory embodiments, directory states may be combined within each directory entry such that they are indistinguishable externally to a given processing node. For example, in one embodiment, the Modified (M) directory state may be combined with the Exclusive (E) directory state, and the Shared (S) directory state may be combined with the Owned (O) directory state. Further, in one embodiment, a directory entry may only track a single owner of a cache data block, while in an alternative embodiment a directory entry may track an owner and one or more sharers. Finally, in one directory embodiment, probes may be issued to either one specific processing node or to all processing nodes, while in another directory embodiment, probes may be issued to one or more than one specific processing node or to all processing nodes.

Additionally, it is noted that some embodiments of computer system 10, any combination of the Uncached, Remote, Pairwise-shared, and migraTory directory states may be implemented. Further, in some embodiments of computer system 10, use of a given cache coherence or directory state may be selectively enabled or disabled, for example through the use of control registers located in each processing node 12.

Numerous variations and modifications will become apparent to those skilled in the art once the above disclosure is fully appreciated. It is intended that the following claims be interpreted to embrace all such variations and modifications.

What is claimed is:

1. A method comprising:
    initiating a first store operation to a cache data block stored in a first cache from a first processing node including said first cache;
    assigning a modified cache state to said cache data block in response to initiating said first store operation;
    initiating a first load operation to said cache data block from a second processing node;
    assigning a pairwise-shared directory state to a coherence directory entry corresponding to said cache data block in response to initiating said first load operation;
    wherein said pairwise-shared directory state is distinct from a shared directory state; and
    wherein assigning a pairwise-shared directory state further comprises storing an identity of said first processing node and storing an identity of said second processing node.

2. The method as recited in claim 1, further comprising:
    initiating a second store operation to said cache data block from said first processing node subsequent to assigning a pairwise-shared directory state to said cache data block;
    assigning a modified directory state to said coherence directory entry in response to initiating said second store operation; and
    issuing an invalidating probe only to said second processing node in response to initiating said second store operation.

3. The method as recited in claim 1, further comprising:
    initiating a second store operation to said cache data block from said second processing node subsequent to assigning a pairwise-shared directory state to said cache data block;
    assigning a modified directory state to said coherence directory entry in response to initiating said second store operation; and
    issuing an invalidating probe only to said first processing node in response to initiating said second store operation.

4. The method as recited in claim 1, further comprising:
    initiating a second store operation to said cache data block from a third processing node subsequent to assigning a pairwise-shared directory state to said cache data block;
    assigning a modified directory state to said coherence directory entry in response to initiating said second store operation; and
    broadcasting a probe to all processing nodes in response to initiating said second store operation.

5. The method as recited in claim 1, further comprising:
    initiating a second load operation to said cache data block from a third processing node subsequent to assigning a pairwise-shared directory state to said cache data block;
    assigning an shared directory state to said coherence directory entry in response to initiating said second load operation; and
    issuing a probe only to said first processing node in response to initiating said second load operation.

6. A system comprising:
    a coherence directory;
    a first processing node coupled to said coherence directory and comprising a first cache; and
    a second processing node coupled to said coherence directory;
    wherein said coherence directory is configured to transition a coherence directory entry of a corresponding cache data block to a modified directory state in response to said first processing node initiating a first store operation to said cache data block;
    wherein said second processing node is configured to initiate a first load operation to said cache data block subsequent to said first processing node initiating said first store operation;
    wherein said coherence directory is configured to transition said coherence directory entry of said cache data block from a modified directory state to a pairwise-shared directory state in response to said second processing node initiating said first load operation to said cache data block;
    wherein said pairwise-shared directory state is distinct from owned and shared directory states; and
    wherein transitioning to a pairwise-shared directory state further comprises storing an identity of said first processing node and storing an identity of said second processing node.

7. The system as recited in claim 6, wherein said coherence directory is further configured to transition said coherence directory entry from a pairwise-shared directory state to a modified directory state in response to said second processing node initiating a second store operation to said cache data block, and wherein said coherence directory is further configured to cause a probe to be issued only to said first processing node in response to said second processing node initiating said second store operation.

8. The system as recited in claim 6, wherein said coherence directory is further configured to transition said coherence directory entry from a pairwise-shared directory state to a modified directory state in response to said first processing node initiating a second store operation to said cache data block, and wherein said coherence directory is further configured to cause a probe to be issued only to said second processing node in response to said first processing node initiating said second store operation.

9. The system as recited in claim 6, further comprising a third processing node coupled to said first and said second processing nodes, wherein said coherence directory is further configured to transition said coherence directory entry from a pairwise-shared directory state to a modified directory state in response to said third processing node initiating a second store operation to said cache data block, and wherein said coherence directory is further configured to cause probes to be broadcast to all processing nodes in response to said third processing node initiating said second store operation.

10. The system as recited in claim 6, further comprising a third processing node coupled to said first and said second processing nodes, wherein said coherence directory is further configured to transition said coherence directory entry from a pairwise-shared directory state to an owned directory state in response to said third processing node initiating a second load operation to said cache data block, and wherein said coherence directory is further configured to cause a probe to be issued only to said first processing node in response to said third processing node initiating said second load operation.

* * * * *